(12) United States Patent
Kiilerich Pratas et al.

(10) Patent No.: US 12,323,934 B2
(45) Date of Patent: Jun. 3, 2025

(54) APPARATUS AND METHOD

(71) Applicant: Nokia Technologies Oy, Espoo (FI)

(72) Inventors: Nuno Manuel Kiilerich Pratas, Gistrup (DK); Ling Yu, Kauniainen (FI); Torsten Wildschek, Gloucester (GB); Renato Barbosa Abreu, Aalborg (DK); Timo Erkki Lunttila, Espoo (FI); Laura Luque Sanchez, Nibe (DK); Vinh Van Phan, Oulu (FI); Yong Liu, Shanghai (CN); Jianguo Liu, Minhang Shanghai (CN); Naizheng Zheng, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/859,576

(22) PCT Filed: Apr. 28, 2022

(86) PCT No.: PCT/CN2022/089789
§ 371 (c)(1),
(2) Date: Oct. 24, 2024

(87) PCT Pub. No.: WO2023/206206
PCT Pub. Date: Nov. 2, 2023

(65) Prior Publication Data
US 2025/0113316 A1    Apr. 3, 2025

(51) Int. Cl.
*H04J 3/06*     (2006.01)
*H04W 56/00*    (2009.01)
(Continued)

(52) U.S. Cl.
CPC ... *H04W 56/0015* (2013.01); *H04W 74/0816* (2013.01); *H04W 92/18* (2013.01)

(58) Field of Classification Search
CPC ......... H04W 56/0015; H04W 74/0816; H04W 92/18
(Continued)

(56) References Cited

U.S. PATENT DOCUMENTS 11,089,581 B2 * 8/2021 Åström ............... H04W 56/001
2020/0245341 A1   7/2020 Wu et al.
(Continued)

FOREIGN PATENT DOCUMENTS

CN     113767682 A      12/2021
WO     2020030983 A1    2/2020

OTHER PUBLICATIONS

Nokia et al. "Remaining details of Sidelink Synchronization mechanism" 3GPP TSG-RAN WGJ Meeting #100-e RI-2000385, Mar. 6, 2020 (Mar. 6, 2020), section 2.
(Continued)

*Primary Examiner* — Chuong T Ho
(74) *Attorney, Agent, or Firm* — Robert P. Michal, Esq.; Carter, DeLuca & Farrell LLP

(57) ABSTRACT

A method and an apparatus for a second user equipment, that causes the apparatus to perform: determining whether a synchronization signal has been received during a first set of synchronization resources; and when it is determined the synchronization signal was received, determining that the apparatus is allowed to use communication resources during a second set of synchronization resources for a first sidelink communication; and when it is determined the synchronization was not received, abstaining from using the communication resources during the second set of synchronization resources for a first sidelink communication; and monitoring the second set of synchronization resources for a synchronization signal.

9 Claims, 17 Drawing Sheets

(51) Int. Cl.
*H04W 74/0816* (2024.01)
*H04W 92/18* (2009.01)

(58) Field of Classification Search
USPC .......................................................... 370/503
See application file for complete search history.

(56) References Cited

U.S. PATENT DOCUMENTS

2021/0297961 A1* 9/2021 Park ..................... H04W 74/08
2024/0267859 A1* 8/2024 Ma ........................ H04W 56/00

OTHER PUBLICATIONS

International Search Report issued by the National Intellectual Property Administration, PRC acting as the International Searching Authority in relation to International Application No. PCT/CN2022/089789 dated Dec. 15, 2022 (3 pages).
Written Opinion of the International Searching Authority issued by National Intellectual Property Administration, PRC acting as the International Searching Authority in relation to International Application No. PCT/CN2022/089789 dated Dec. 15, 2022 (4 pages).

* cited by examiner

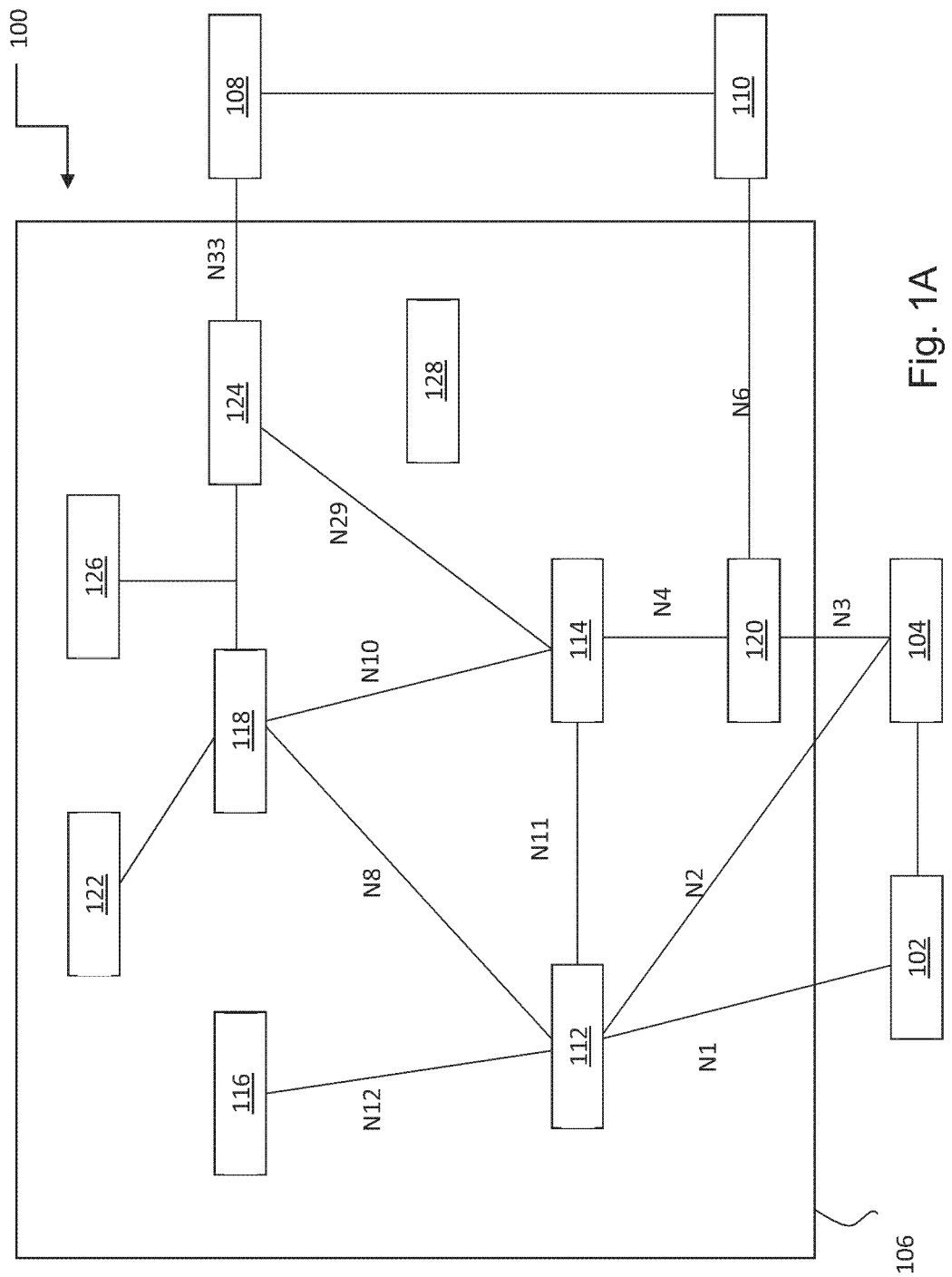

APPARATUS AND METHOD

CROSS-REFERENCE TO RELATED APPLICATIONS

This application is a national phase entry under 35 U.S.C. 371 of PCT International Application No. PCT/CN2022/089789 filed Apr. 28, 2022, the disclosure of this application is expressly incorporated herein by reference in its entirety.

FIELD

Various examples described herein generally relate to apparatus, methods, and computer programs, and more particularly (but not exclusively) to apparatus, methods and computer programs for network apparatuses.

BACKGROUND

In general, a communication system can be seen as a facility that enables communication sessions between two or more entities such as user terminals, access nodes and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

In 5G, a UE Registration Area (RA) comprises a list of one or more Tracking Areas (TA). A Tracking Area is a logical concept of an area where a UE can move around without updating the network. The network can allocate a list with one or more TAs to the UE.

SUMMARY

According to a first aspect, there is provided a method for an apparatus for a first user equipment, the method comprising: determining to provide at least one synchronization signal for sidelink communications to a second user equipment; determining whether to transmit a synchronization signal using a first set of synchronization resources; and when it is determined to transmit the synchronization signal, abstaining from transmitting a synchronization signal using a second set of synchronization resources; and when it is determined to abstain from transmitting the synchronization signal in the first set of synchronization resources: determining whether to transmit the synchronization signal using the second set of synchronization resources; and abstaining from using any resource coinciding in time with the second set of synchronization resources for transmitting and/or receiving a first sidelink communication.

The method may comprise, when it is determined to abstain from transmitting the synchronization signal: selecting a first set of communication resources for transmitting the first sidelink communication that does not coincide in time with the second set of synchronization resources in response to determining that the first user apparatus intends to transmit the first sidelink communication during the second set of synchronization resources; and using the first set of communication resources for transmitting the first sidelink communication.

The method may comprise, when it is determined to abstain from transmitting the synchronization signal; determining that the first user apparatus intends to, during the second set of synchronization resources, transmit first feedback in respect of a received second sidelink communication; and abstaining from transmitting the first feedback during the second set of synchronization resources in response to the determination.

The method may comprise, when it is determined to abstain from transmitting the synchronization signal: determining that the first user apparatus intends to request to receive second feedback in respect of a third sidelink communication, with the second feedback being expected to be received during the second set of synchronization resources; and abstaining from requesting the second feedback.

The determining whether to transmit the synchronization signal may comprise: when it is determined that a synchronization signal was received from another user equipment during the first set of synchronization resources, abstaining from transmitting the synchronization signal during the second set of synchronization resources; and when it is determined that a synchronization signal was not received from another user equipment during the first set of synchronization resources, determining whether the first user equipment is allowed to transmit the synchronization signal during the second set of synchronization resources.

The determining whether the first user equipment is allowed to transmit the synchronization signal may comprise performing a listen before talk operation.

The method may comprise, when it is determined that the synchronization signal was not transmitted in the second set of synchronization resources by the first user equipment, determining whether to transmit a synchronization signal using a third set of synchronization resources.

The determining whether to transmit the synchronization signal using the first set of synchronization resources may comprise performing a listen before talk operation to determine whether the first user equipment is allowed to transmit the synchronization signal.

According to a second aspect, there is provided a method for an apparatus for a second user equipment, the method comprising: determining whether a synchronization signal has been received during a first set of synchronization resources; and when it is determined the synchronization signal was received, determining that the apparatus is allowed to use communication resources during a second set of synchronization resources for a first sidelink communication; and when it is determined the synchronization was not received, abstaining from using the communication resources during the second set of synchronization resources for a first sidelink communication; and monitoring the second set of synchronization resources for a synchronization signal.

The method may comprise, when it is determined to abstain from using the second set of synchronization resources for the first sidelink communication: selecting a first set of communication resources for transmitting the first sidelink communication that do not occur during the second set of synchronization resources.

The method may comprise, when it is determined to abstain from using the second set of synchronization resources for the first sidelink communication: determining that the second user apparatus intends to transmit first feedback in respect of a received second sidelink communication during the second set of synchronization resources; and abstaining from transmitting the first feedback during the second set of synchronization resources in response to the determination.

The method may comprise, when it is determined to abstain from using the second set of synchronization resources for the first sidelink communication: determining that the second user apparatus intends to request to receive second feedback in respect of a third sidelink communication, with the second feedback being expected to be received during the second set of synchronization resources; and abstaining from requesting the second feedback.

The method may comprise, when it is determined that the secondary synchronization signal was not received by the second user equipment during the second synchronization resources, abstaining from using a tertiary set of synchronization resources for the first sidelink communication.

The determining whether the synchronization signal has been received during the first set of synchronization resources may comprise: determining a power of signals received during the first set of synchronization resources; comparing the power to a threshold power value; and determining that the synchronization signal has been received during the first set of synchronization resources when the power equals and/or exceeds the threshold power value; and determining that the synchronization signal has not been received during the first set of synchronization resources when the power is less than the threshold power value.

According to a third aspect, there is provided an apparatus for a first user equipment, the apparatus comprising means for: determining to provide at least one synchronization signal for sidelink communications to a second user equipment; determining whether to transmit a synchronization signal using a first set of synchronization resources; and when it is determined to transmit the synchronization signal, abstaining from transmitting a synchronization signal using a second set of synchronization resources; and when it is determined to abstain from transmitting the synchronization signal in the first set of synchronization resources: determining whether to transmit the synchronization signal using the second set of synchronization resources; and abstaining from using any resource coinciding in time with the second set of synchronization resources for transmitting and/or receiving a first sidelink communication.

The apparatus may comprise means for, when it is determined to abstain from transmitting the synchronization signal: selecting a first set of communication resources for transmitting the first sidelink communication that does not coincide in time with the second set of synchronization resources in response to determining that the first user apparatus intends to transmit the first sidelink communication during the second set of synchronization resources; and using the first set of communication resources for transmitting the first sidelink communication.

The apparatus may comprise means for, when it is determined to abstain from transmitting the synchronization signal; determining that the first user apparatus intends to, during the second set of synchronization resources, transmit first feedback in respect of a received second sidelink communication; and abstaining from transmitting the first feedback during the second set of synchronization resources in response to the determination.

The apparatus may comprise means for, when it is determined to abstain from transmitting the synchronization signal: determining that the first user apparatus intends to request to receive second feedback in respect of a third sidelink communication, with the second feedback being expected to be received during the second set of synchronization resources; and abstaining from requesting the second feedback.

The means for determining whether to transmit the synchronization signal may comprise means for: when it is determined that a synchronization signal was received from another user equipment during the first set of synchronization resources, abstaining from transmitting the synchronization signal during the second set of synchronization resources; and when it is determined that a synchronization signal was not received from another user equipment during the first set of synchronization resources, determining whether the first user equipment is allowed to transmit the synchronization signal during the second set of synchronization resources.

The means for determining whether the first user equipment is allowed to transmit the synchronization signal may comprise means for performing a listen before talk operation.

The apparatus may comprise means for, when it is determined that the synchronization signal was not transmitted in the second set of synchronization resources by the first user equipment, determining whether to transmit a synchronization signal using a third set of synchronization resources.

The means for determining whether to transmit the synchronization signal using the first set of synchronization resources may comprise means for performing a listen before talk operation to determine whether the first user equipment is allowed to transmit the synchronization signal.

According to a fourth aspect, there is provided an apparatus for a second user equipment, the apparatus comprising means for: determining whether a synchronization signal has been received during a first set of synchronization resources; and when it is determined the synchronization signal was received, determining that the apparatus is allowed to use communication resources during a second set of synchronization resources for a first sidelink communication; and when it is determined the synchronization was not received, abstaining from using the communication resources during the second set of synchronization resources for a first sidelink communication; and monitoring the second set of synchronization resources for a synchronization signal.

The apparatus may comprise means for, when it is determined to abstain from using the second set of synchronization resources for the first sidelink communication: selecting a first set of communication resources for transmitting the first sidelink communication that do not occur during the second set of synchronization resources.

The apparatus may comprise means for, when it is determined to abstain from using the second set of synchronization resources for the first sidelink communication: determining that the second user apparatus intends to transmit first feedback in respect of a received second sidelink communication during the second set of synchronization resources; and abstaining from transmitting the first feedback during the second set of synchronization resources in response to the determination.

The apparatus may comprise means for, when it is determined to abstain from using the second set of synchronization resources for the first sidelink communication: determining that the second user apparatus intends to request to receive second feedback in respect of a third sidelink communication, with the second feedback being expected to be received during the second set of synchronization resources; and abstaining from requesting the second feedback.

The apparatus may comprise means for, when it is determined that the secondary synchronization signal was not received by the second user equipment during the second synchronization resources, abstaining from using a tertiary set of synchronization resources for the first sidelink communication.

The means for determining whether the synchronization signal has been received during the first set of synchronization resources may comprise means for: determining a power of signals received during the first set of synchronization resources; comparing the power to a threshold power value; and determining that the synchronization signal has been received during the first set of synchronization resources when the power equals and/or exceeds the threshold power value; and determining that the synchronization signal has not been received during the first set of synchronization resources when the power is less than the threshold power value.

According to a fifth aspect, there is provided an apparatus for a first user equipment, the apparatus comprising: at least one processor; and at least one memory comprising code that, when executed by the at least one processor, causes the apparatus to: determine to provide at least one synchronization signal for sidelink communications to a second user equipment; determine whether to transmit a synchronization signal using a first set of synchronization resources; and when it is determined to transmit the synchronization signal, abstain from transmitting a synchronization signal using a second set of synchronization resources; and when it is determined to abstain from transmitting the synchronization signal in the first set of synchronization resources: determine whether to transmit the synchronization signal using the second set of synchronization resources; and abstain from using any resource coinciding in time with the second set of synchronization resources for transmitting and/or receiving a first sidelink communication.

The apparatus may be caused to, when it is determined to abstain from transmitting the synchronization signal: select a first set of communication resources for transmitting the first sidelink communication that does not coincide in time with the second set of synchronization resources in response to determining that the first user apparatus intends to transmit the first sidelink communication during the second set of synchronization resources; and use the first set of communication resources for transmitting the first sidelink communication.

The apparatus may be caused to, when it is determined to abstain from transmitting the synchronization signal: determine that the first user apparatus intends to, during the second set of synchronization resources, transmit first feedback in respect of a received second sidelink communication; and abstain from transmitting the first feedback during the second set of synchronization resources in response to the determination.

The apparatus may be caused to, when it is determined to abstain from transmitting the synchronization signal: determine that the first user apparatus intends to request to receive second feedback in respect of a third sidelink communication, with the second feedback being expected to be received during the second set of synchronization resources; and abstain from requesting the second feedback.

The determining whether to transmit the synchronization signal may comprise: when it is determined that a synchronization signal was received from another user equipment during the first set of synchronization resources, abstaining from transmitting the synchronization signal during the second set of synchronization resources; and when it is determined that a synchronization signal was not received from another user equipment during the first set of synchronization resources, determining whether the first user equipment is allowed to transmit the synchronization signal during the second set of synchronization resources.

The determining whether the first user equipment is allowed to transmit the synchronization signal may comprise performing a listen before talk operation.

The apparatus may be caused to, when it is determined that the synchronization signal was not transmitted in the second set of synchronization resources by the first user equipment, determine whether to transmit a synchronization signal using a third set of synchronization resources.

The determining whether to transmit the synchronization signal using the first set of synchronization resources may comprise performing a listen before talk operation to determine whether the first user equipment is allowed to transmit the synchronization signal.

According to a sixth aspect, there is provided an apparatus for a second user equipment, the apparatus comprising: at least one processor; and at least one memory comprising code that, when executed by the at least one processor, causes the apparatus to: determine whether a synchronization signal has been received during a first set of synchronization resources; and when it is determined the synchronization signal was received, determine that the apparatus is allowed to use communication resources during a second set of synchronization resources for a first sidelink communication; and when it is determined the synchronization was not received, abstain from using the communication resources during the second set of synchronization resources for a first sidelink communication; and monitor the second set of synchronization resources for a synchronization signal.

The apparatus may be caused to, when it is determined to abstain from using the second set of synchronization resources for the first sidelink communication: select a first set of communication resources for transmitting the first sidelink communication that do not occur during the second set of synchronization resources.

The apparatus may be caused to, when it is determined to abstain from using the second set of synchronization resources for the first sidelink communication: determine that the second user apparatus intends to transmit first feedback in respect of a received second sidelink communication during the second set of synchronization resources; and abstain from transmitting the first feedback during the second set of synchronization resources in response to the determination.

The apparatus may be caused to, when it is determined to abstain from using the second set of synchronization resources for the first sidelink communication: determine that the second user apparatus intends to request to receive second feedback in respect of a third sidelink communication, with the second feedback being expected to be received during the second set of synchronization resources; and abstain from requesting the second feedback.

The apparatus may be caused to, when it is determined that the secondary synchronization signal was not received by the second user equipment during the second synchronization resources, abstain from using a tertiary set of synchronization resources for the first sidelink communication.

The determining whether the synchronization signal has been received during the first set of synchronization resources may comprise: determining a power of signals received during the first set of synchronization resources; comparing the power to a threshold power value; and determining that the synchronization signal has been received during the first set of synchronization resources when the power equals and/or exceeds the threshold power value; and determining that the synchronization signal has not been received during the first set of synchronization resources when the power is less than the threshold power value.

According to a seventh aspect, there is provided an apparatus for a first user equipment, the apparatus comprising: determining circuitry for determining to provide at least one synchronization signal for sidelink communications to a second user equipment; determining circuitry for determining whether to transmit a synchronization signal using a first set of synchronization resources; and when it is determined to transmit the synchronization signal, abstaining circuitry for abstaining from transmitting a synchronization signal using a second set of synchronization resources; and when it is determined to abstain from transmitting the synchronization signal in the first set of synchronization resources: determining circuitry for determining whether to transmit the synchronization signal using the second set of synchronization resources; and abstaining circuitry for abstaining from using any resource coinciding in time with the second set of synchronization resources for transmitting and/or receiving a first sidelink communication.

The apparatus may comprise, when it is determined to abstain from transmitting the synchronization signal: selecting circuitry for selecting a first set of communication resources for transmitting the first sidelink communication that does not coincide in time with the second set of synchronization resources in response to determining that the first user apparatus intends to transmit the first sidelink communication during the second set of synchronization resources; and using circuitry for using the first set of communication resources for transmitting the first sidelink communication.

The apparatus may comprise, when it is determined to abstain from transmitting the synchronization signal; determining circuitry for determining that the first user apparatus intends to, during the second set of synchronization resources, transmit first feedback in respect of a received second sidelink communication; and abstaining circuitry for abstaining from transmitting the first feedback during the second set of synchronization resources in response to the determination.

The apparatus may comprise, when it is determined to abstain from transmitting the synchronization signal: determining circuitry for determining that the first user apparatus intends to request to receive second feedback in respect of a third sidelink communication, with the second feedback being expected to be received during the second set of synchronization resources; and abstaining circuitry for abstaining from requesting the second feedback.

The determining circuitry for determining whether to transmit the synchronization signal may comprise: when it is determined that a synchronization signal was received from another user equipment during the first set of synchronization resources, abstaining circuitry for abstaining from transmitting the synchronization signal during the second set of synchronization resources; and when it is determined that a synchronization signal was not received from another user equipment during the first set of synchronization resources, determining circuitry for determining whether the first user equipment is allowed to transmit the synchronization signal during the second set of synchronization resources.

The determining circuitry for determining whether the first user equipment is allowed to transmit the synchronization signal may comprise performing circuitry for performing a listen before talk operation.

The apparatus may comprise, when it is determined that the synchronization signal was not transmitted in the second set of synchronization resources by the first user equipment, determining circuitry for determining whether to transmit a synchronization signal using a third set of synchronization resources.

The determining circuitry for determining whether to transmit the synchronization signal using the first set of synchronization resources may comprise performing circuitry for performing a listen before talk operation to determine whether the first user equipment is allowed to transmit the synchronization signal.

According to an eighth aspect, there is provided an apparatus for a second user equipment, the apparatus comprising: determining circuitry for determining whether a synchronization signal has been received during a first set of synchronization resources; and when it is determined the synchronization signal was received, determining circuitry for determining that the apparatus is allowed to use communication resources during a second set of synchronization resources for a first sidelink communication; and when it is determined the synchronization was not received, abstaining circuitry for abstaining from using the communication resources during the second set of synchronization resources for a first sidelink communication; and monitoring circuitry for monitoring the second set of synchronization resources for a synchronization signal.

The apparatus may comprise, when it is determined to abstain from using the second set of synchronization resources for the first sidelink communication: selecting circuitry for selecting a first set of communication resources for transmitting the first sidelink communication that do not occur during the second set of synchronization resources.

The apparatus may comprise, when it is determined to abstain from using the second set of synchronization resources for the first sidelink communication: determining circuitry for determining that the second user apparatus intends to transmit first feedback in respect of a received second sidelink communication during the second set of synchronization resources; and abstaining circuitry for abstaining from transmitting the first feedback during the second set of synchronization resources in response to the determination.

The apparatus may comprise, when it is determined to abstain from using the second set of synchronization resources for the first sidelink communication: determining circuitry for determining that the second user apparatus intends to request to receive second feedback in respect of a third sidelink communication, with the second feedback being expected to be received during the second set of synchronization resources; and abstaining circuitry for abstaining from requesting the second feedback.

The apparatus may comprise, when it is determined that the secondary synchronization signal was not received by the second user equipment during the second synchronization resources, abstaining circuitry for abstaining from using a tertiary set of synchronization resources for the first sidelink communication.

The determining circuitry for determining whether the synchronization signal has been received during the first set of synchronization resources may comprise: determining circuitry for determining a power of signals received during the first set of synchronization resources; comparing circuitry for comparing the power to a threshold power value; and determining circuitry for determining that the synchronization signal has been received during the first set of synchronization resources when the power equals and/or exceeds the threshold power value; and determining circuitry for determining that the synchronization signal has not been received during the first set of synchronization resources when the power is less than the threshold power value.

According to a ninth aspect, there is provided there is provided non-transitory computer readable medium comprising program instructions for causing an apparatus for a first user equipment to perform at least the following: determine to provide at least one synchronization signal for sidelink communications to a second user equipment; determine whether to transmit a synchronization signal using a first set of synchronization resources; and when it is determined to transmit the synchronization signal, abstain from transmitting a synchronization signal using a second set of synchronization resources; and when it is determined to abstain from transmitting the synchronization signal in the first set of synchronization resources: determine whether to transmit the synchronization signal using the second set of synchronization resources; and abstain from using any resource coinciding in time with the second set of synchronization resources for transmitting and/or receiving a first sidelink communication.

The apparatus may be caused to, when it is determined to abstain from transmitting the synchronization signal: select a first set of communication resources for transmitting the first sidelink communication that does not coincide in time with the second set of synchronization resources in response to determining that the first user apparatus intends to transmit the first sidelink communication during the second set of synchronization resources; and use the first set of communication resources for transmitting the first sidelink communication.

The apparatus may be caused to, when it is determined to abstain from transmitting the synchronization signal; determine that the first user apparatus intends to, during the second set of synchronization resources, transmit first feedback in respect of a received second sidelink communication; and abstain from transmitting the first feedback during the second set of synchronization resources in response to the determination.

The apparatus may be caused to, when it is determined to abstain from transmitting the synchronization signal: determine that the first user apparatus intends to request to receive second feedback in respect of a third sidelink communication, with the second feedback being expected to be received during the second set of synchronization resources; and abstain from requesting the second feedback.

The determining whether to transmit the synchronization signal may comprise: when it is determined that a synchronization signal was received from another user equipment during the first set of synchronization resources, abstaining from transmitting the synchronization signal during the second set of synchronization resources; and when it is determined that a synchronization signal was not received from another user equipment during the first set of synchronization resources, determining whether the first user equipment is allowed to transmit the synchronization signal during the second set of synchronization resources.

The determining whether the first user equipment is allowed to transmit the synchronization signal may comprise performing a listen before talk operation.

The apparatus may be caused to, when it is determined that the synchronization signal was not transmitted in the second set of synchronization resources by the first user equipment, determine whether to transmit a synchronization signal using a third set of synchronization resources.

The determining whether to transmit the synchronization signal using the first set of synchronization resources may comprise performing a listen before talk operation to determine whether the first user equipment is allowed to transmit the synchronization signal.

According to a tenth aspect, there is provided non-transitory computer readable medium comprising program instructions for causing an apparatus for a second user equipment to perform at least the following: determine whether a synchronization signal has been received during a first set of synchronization resources; and when it is determined the synchronization signal was received, determine that the apparatus is allowed to use communication resources during a second set of synchronization resources for a first sidelink communication; and when it is determined the synchronization was not received, abstain from using the communication resources during the second set of synchronization resources for a first sidelink communication; and monitor the second set of synchronization resources for a synchronization signal.

The apparatus may be caused to, when it is determined to abstain from using the second set of synchronization resources for the first sidelink communication: select a first set of communication resources for transmitting the first sidelink communication that do not occur during the second set of synchronization resources.

The apparatus may be caused to, when it is determined to abstain from using the second set of synchronization resources for the first sidelink communication: determine that the second user apparatus intends to transmit first feedback in respect of a received second sidelink communication during the second set of synchronization resources; and abstain from transmitting the first feedback during the second set of synchronization resources in response to the determination.

The apparatus may be caused to, when it is determined to abstain from using the second set of synchronization resources for the first sidelink communication: determine that the second user apparatus intends to request to receive second feedback in respect of a third sidelink communication, with the second feedback being expected to be received during the second set of synchronization resources; and abstain from requesting the second feedback.

The apparatus may be caused to, when it is determined that the secondary synchronization signal was not received by the second user equipment during the second synchronization resources, abstain from using a tertiary set of synchronization resources for the first sidelink communication.

The determining whether the synchronization signal has been received during the first set of synchronization resources may comprise: determining a power of signals received during the first set of synchronization resources; comparing the power to a threshold power value; and determining that the synchronization signal has been received during the first set of synchronization resources when the power equals and/or exceeds the threshold power value; and determining that the synchronization signal has not been received during the first set of synchronization resources when the power is less than the threshold power value.

According to an eleventh aspect, there is provided a computer program product stored on a medium that may cause an apparatus to perform any method as described herein.

According to a twelfth aspect, there is provided an electronic device that may comprise apparatus as described herein.

According to a thirteenth aspect, there is provided a chipset that may comprise an apparatus as described herein.

BRIEF DESCRIPTION OF FIGURES

Some examples, will now be described, merely by way of illustration only, with reference to the accompanying drawings in which:

FIGS. 1A and 1B show a schematic representation of a 5G system;

DETAILED DESCRIPTION

Figure 1B:
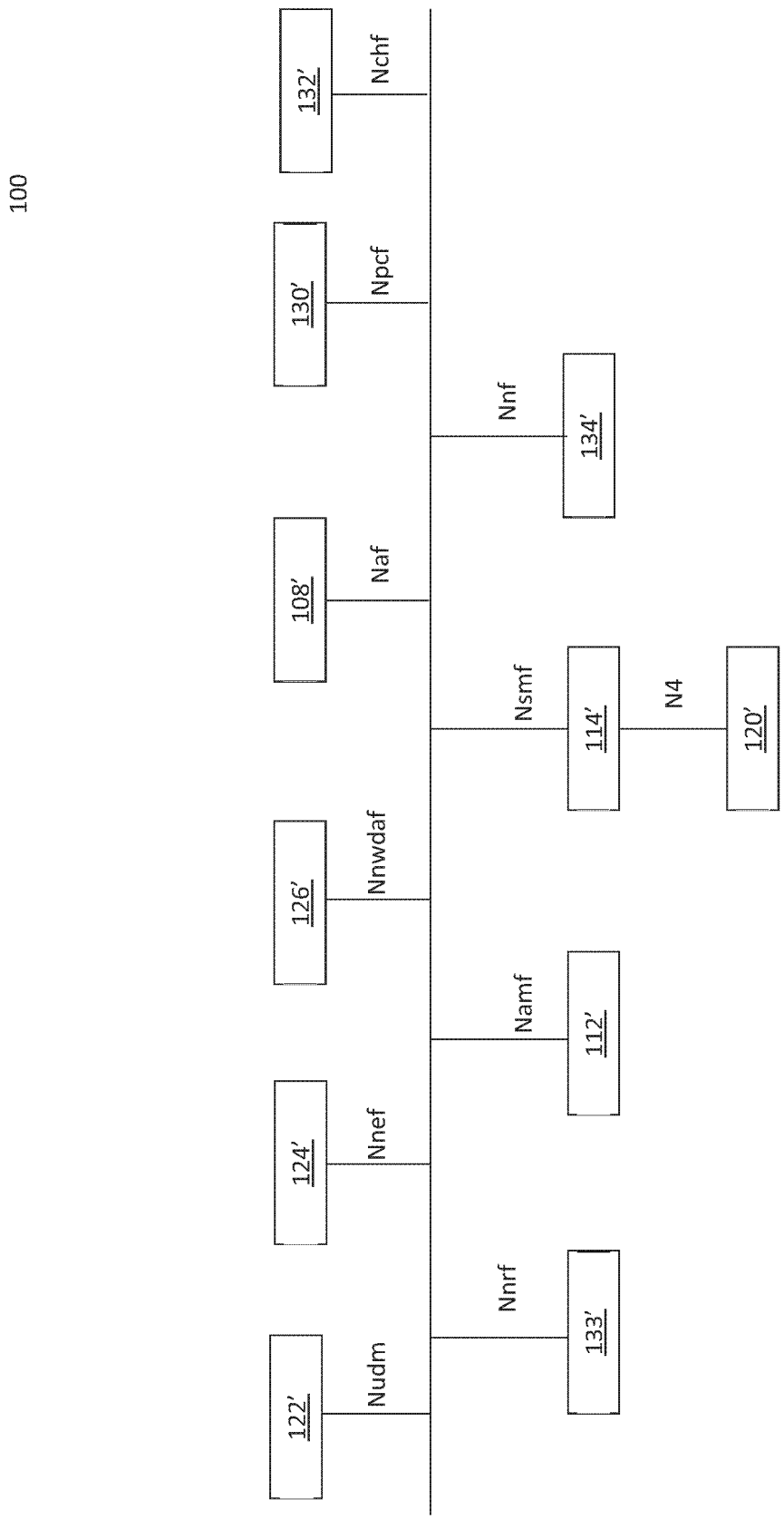

In the following description of examples, certain aspects are explained with reference to mobile communication devices capable of communication via a wireless cellular system and mobile communication systems serving such mobile communication devices. For brevity and clarity, the following describes such aspects with reference to a 5G wireless communication system. However, it is understood that such aspects are not limited to 5G wireless communication systems, and may, for example, be applied to other wireless communication systems (for example, current 6G proposals).

Before describing in detail the examples, certain general principles of a 5G wireless communication system are briefly explained with reference to FIGS. 1A and 1B.

FIG. 1A shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) unit functions. The RAN may comprise one or more access nodes.

The 5GC 106 may comprise one or more Access and Mobility Management Functions (AMF) 112, one or more Session Management Functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. The role of an NEF is to provide secure exposure of network services (e.g. voice, data connectivity, charging, subscriber data, and so forth) towards a 3rd party. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The network may further comprise a management data analytics service (MDAS) producer or MDAS Management Service (MnS) producer. The MDAS MnS producer may provide data analytics in the management plane considering parameters including, for example, load level and/or resource utilization. For example, the MDAS MnS producer for a network function (NF) may collect the NF's load-related performance data, e.g., resource usage status of the NF. The analysis of the collected data may provide forecast of resource usage information in a predefined future time window. This analysis may also recommend appropriate actions e.g., scaling of resources, admission control, load balancing of traffic, and so forth.

FIG. 1B shows a schematic representations of a 5GC represented in current 3GPP specifications. It is understood that this architecture is intended to illustrate potential components that may be comprised in a core network, and the presently described principles are not limited to core networks comprising only the described components.

FIG. 1B shows a 5GC 106' comprising a UPF 120' connected to an SMF 114' over an N4 interface. The SMF 114' is connected to each of a UDM 122', an NEF 124', an NWDAF 126', an AF 108', a Policy Control Function (PCF) 130', an AMF 112', and a Charging function 132' over an interconnect medium that also connects these network functions to each other. The 5G core 106' further comprises a network repository function (NRF) 133' and a network function 134' that connect to the interconnect medium.

3GPP refers to a group of organizations that develop and release different standardized communication protocols. 3GPP develops and publishes documents pertaining to a system of "Releases" (e.g., Release 15, Release 16, and beyond).

In a recent 3GPP working group meeting, sidelink enhancements were considered. During this meeting, the following agreements were made for objectives relating to sidelink communications on the unlicensed spectrum. These objectives are intended to be applicable for both UEs operating in any of mode 1 and mode 2. UEs operating according to Mode 1 are scheduled by the eNB over dedicated radio resources for data transmission. In contrast, UEs operating in Mode 2 may autonomously select a radio resource from a resource pool, which is either configured by the network or pre-configured in the user device for its direct device-to-device (D2D) communication with other UEs.

One of these objectives is to enable the reuse of channel access mechanisms from new radio unlicensed operations for sidelink unlicensed operations. This objective may comprise assessing the applicability of sidelink resource reservations from Releases 16 and 17 to sidelink unlicensed operations within boundaries of unlicensed channel access mechanisms and operations. There may be no specific enhancements for Release 17 resource allocation mechanisms. Further, if it is determined that the existing new radio unlicensed channel access framework does not support the intended unlicensed sidelink functionality, new proposals should be proposed.

Another objective relates to a framework for the physical channel design. In particular, new radio sidelink physical channel structures and procedures may be configured to accommodate structures and procedures for operating on unsilenced spectrum. The existing new radio sidelink and new radio unlicensed physical channel structure may be used as an initial baseline for determining how the physical channel is to be restructured.

To aid clarity, the following considers an expected behaviour of a UE when the UE is accessing unlicensed spectrum for a sidelink transmission. This expected behaviour is based, at least in part, on current specifications that govern the uplink transmission in unlicensed spectrum (see, for example, 3GPP TS 37.213).

First, new radio (NR) sidelink (SL) operation in the unlicensed spectrum is considered.

In sub-7 GHz unlicensed bands, NR coexistence with other communication systems (such as, for example, IEEE 802.11) may be effected via a Listen Before Talking (LBT) channel access mechanism. This means that a user equipment (UE) intending to perform a sidelink (SL) transmission needs to first successfully complete an LBT check before being able to initiate that sidelink transmission in order to determine that the resources intended to be used for the sidelink transmission are not currently being used by another communication mechanism. A sidelink communication is a communication that is performed directly between UEs (i.e., it is not relayed through a radio access network apparatus). In other words, a sidelink communication is a type of device-to-device (D2D) communication.

For a UE to pass an LBT check, the UE must observe the channel as available for a number of consecutive time slots (e.g., Clear Channel Assessment (CCA) slots). In sub-7 GHz the duration of each of these slots is 9 µs. The UE may deem the channel as "available" in any individual CCA slot when the measured power (i.e. the energy detected by the UE during the individual CCA slot) is below a regulatory specified threshold (which may depend on the operating band and geographical region).

When a UE initiates the communication (i.e., when the UE takes the role of initiating device), then this UE has to acquire the "right" to access the channel for a certain period of time. This certain period of time is also called a "Channel Occupancy Time" (COT). In one example, the UE may acquire the "right" to access the channel by applying an "extended" LBT procedure, in which the channel being access must be deemed by the UE as being free for the entire duration of a Contention Window (CW). This "extended" LBT procedure, is commonly known as LBT Type 1, and is specified in 3GPP TS 37.213. This procedure is illustrated in FIG. 6.

Figure 6:
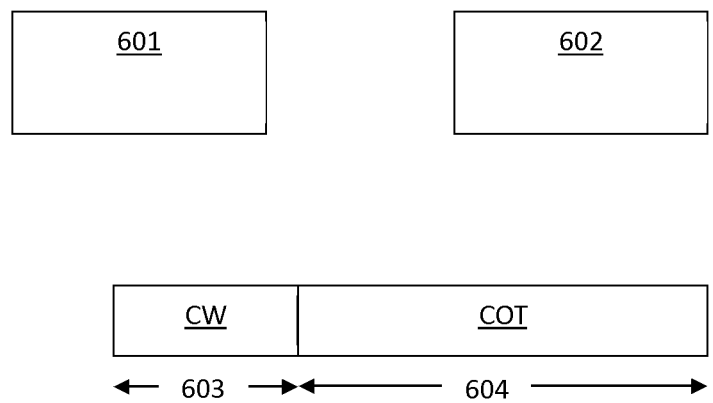
FIGS. 6 to 7 illustrate channel occupancy time and/or contention windows.

FIG. 6 illustrates an initiating UE 601 seeking to communicate with a responding device 602. In order to effect this, the initiating UE 601 performs an LBT mechanism for a duration of a CW 603. When the UE 601 determines that the channel to be used is "free" for the duration of the CW 603, the initiating UE 601 assumes that the initiating UE has the right to attempt to communicate with the responding device 602 during a COT duration 604.

The duration of both the COT 604 and CW 603 may depend on a priority for the communications to be made. For example, the duration(s) may depend on Channel Access Priority Class (CAPC) associated with the UE's traffic. This is illustrated below with respect to Table 1.

Table 1 illustrates, for each CAPC, p, minimum and maximum CW durations, COT durations, and allowed $CW_p$ sizes. Control plane traffic (such as PSCCH) is transmitted with p=1, while user plane traffic has p>1. In Table 1, the LBT Type 1 details are depicted for the Uu uplink (UL) case. However, it is understood that analogous parameters may be detailed for the downlink (DL) case LBT Type 1.

TABLE 1

From TS 37.213 "Table 4.2.1-1: Channel Access Priority Class (CAPC) for UL". The contention window length in CCA slots associated with each CAPC has a minimum ($CW_{min, p}$) and maximum ($CW_{max, p}$). The duration of the COT is given by $T_{ulm\ cot, p}$.

| Channel Access Priority Class (p) | $m_p$ (used as input to compute a defer time) | $CW_{min, p}$ (in clear channel assessment (CCA) slots), which have a 9 μs duration | $CW_{max, p}$ (in clear channel assessment (CCA) slots), which have a 9 μs duration | $T_{ulm\ cot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot, p}$ = 10 ms if the higher layer parameter absenceOfAnyOtherTechnology-r14 or absenceOfAnyOtherTechnology-r16 is provided, otherwise, $T_{ulm\ cot, p}$ = 6 ms.
NOTE 2:
When $T_{ulm\ cot, p}$ = 6 ms it may be increased to 8 ms by inserting one or more gaps. The minimum duration of a gap is 100 μs. The maximum duration before including any such gap shall be 6 ms.

The UE initiating the transmission (the initiating device) may, upon successfully completing the LBT Type 1 operation and performing a transmission, acquire the COT with duration associated with the corresponding CAPC. The acquired COT may be valid even in the case where the initiating device pauses its transmission, although when the initiating device wants to perform a new transmission (still within the COT duration), the initiating device may still perform a "reduced" LBT procedure. This "reduced" LBT procedure, is labelled as an LBT Type 2 procedure in 3GPP TS 37.213 and has at least the following three variants (illustrated with respect to FIGS. 7A to 7F).

Figure 7A:
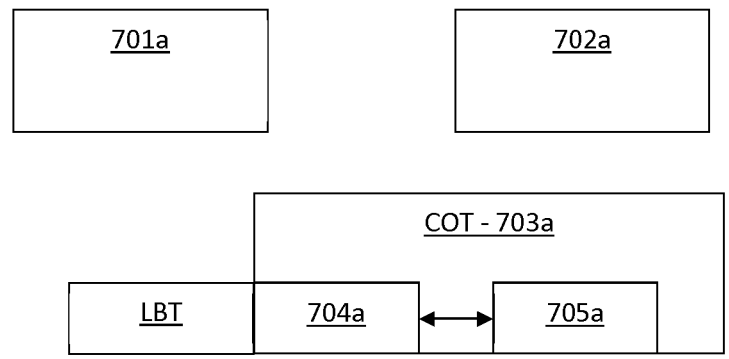
Figure 7B:
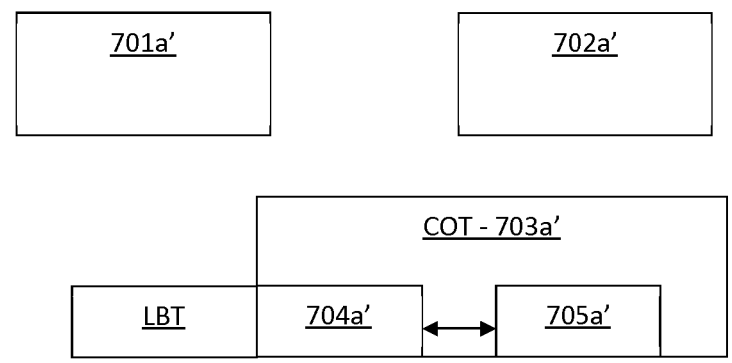

Type 2A procedures are illustrated with respect to FIGS. 7A and 7B (c+f in example). In these Type 2A examples, there is a gap between first and seconds transmissions made within a COT duration, where the gap is more than 16 μs. Type 2A procedures use an LBT mechanism prior to the second transmission being made, wherein the duration of the LBT mechanism is 25 μs.

FIG. 7A illustrates an initiating device 701*a* and a responding device 702*a*. The initiating device 701*a* determines that it is entitled to transmit signals to the responding device 702*a* during a COT window 703*a*. Within this COT window 703*a*, the initiating device 701*a* is configured to make both a first transmission 704*a* and a second transmission 705*a* to the responding device 702*a*. The time difference between the end of the first transmission 704*a* and the beginning of the second transmission is more than 16 μs. In practice, since the LBT Type 2A duration is 25 μs, then the minimum time difference between the end of the first transmission 704*a* and the beginning of the second transmission is 25 μs.

FIG. 7B illustrates an initiating device 701*a*' and a responding device 702*a*'. The initiating device 701*a*' determines that it is entitled to transmit signals to the responding device 702*a*' during a COT window 703*a*'. Within this COT window 703*a*, the initiating device 701*a*' is configured to make a first transmission 704*a*' to the responding device and the responding device 702*a*' is configured to make a second transmission 705*a*' to the initiating device 701*a*'. The time difference between the end of the first transmission 704*a*' and the beginning of the second transmission is less than and/or equal to 25 μs.

Figure 7C:
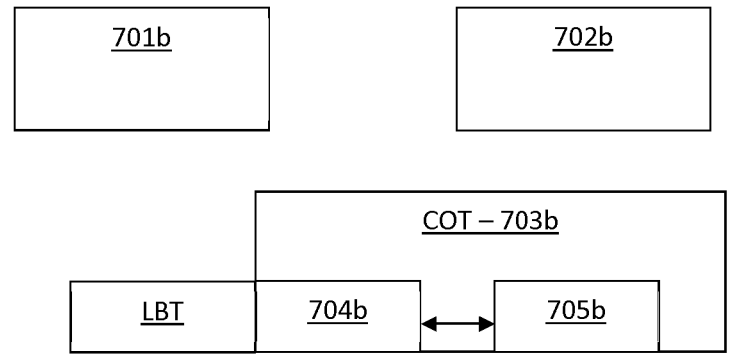
Figure 7D:
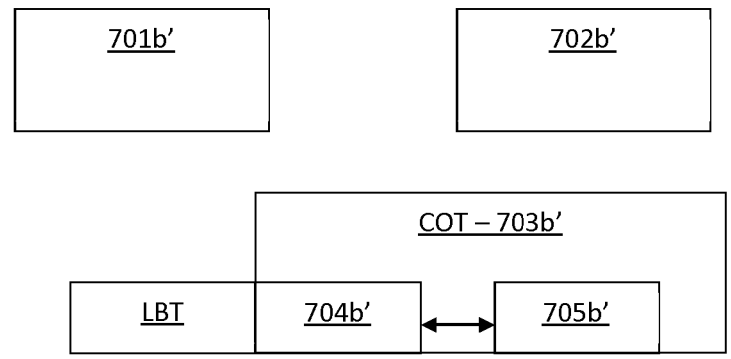

Type 2B procedures are illustrated with respect to FIGS. 7C and 7D (b+e in example). In these Type 2B examples, there is a gap between first and seconds transmissions made within a COT duration, where the gap is equal to 16 μs. Type 2B procedures use an LBT mechanism prior to the second transmission being made, wherein the duration of the LBT mechanism is 16 μs.

FIG. 7C illustrates an initiating device 701*b* and a responding device 702*b*. The initiating device 701*b* determines that it is entitled to transmit signals to the responding device 702*b* during a COT window 703*b*. Within this COT window 703*b*, the initiating device 701*b* is configured to make both a first transmission 704*b* and a second transmission 705*b* to the responding device 702*b*. The time difference between the end of the first transmission 704*b* and the beginning of the second transmission is equal to 16 μs.

FIG. 7D illustrates an initiating device 701*b*' and a responding device 702*b*'. The initiating device 701*b*' determines that it is entitled to transmit signals to the responding device 702*b*' during a COT window 703*b*'. Within this COT window 703*b*, the initiating device 701*b*' is configured to make a first transmission 704*b*' to the responding device and the responding device 702*b*' is configured to make a second transmission 705*b*' to the initiating device 701*b*'. The time difference between the end of the first transmission 704*b*' and the beginning of the second transmission is equal to 16 μs.

Figure 7E:
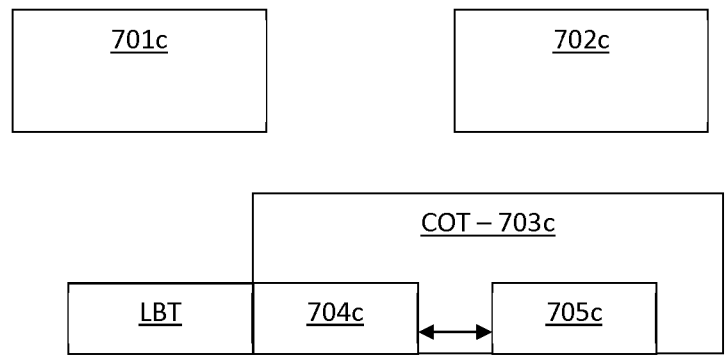
Figure 7F:
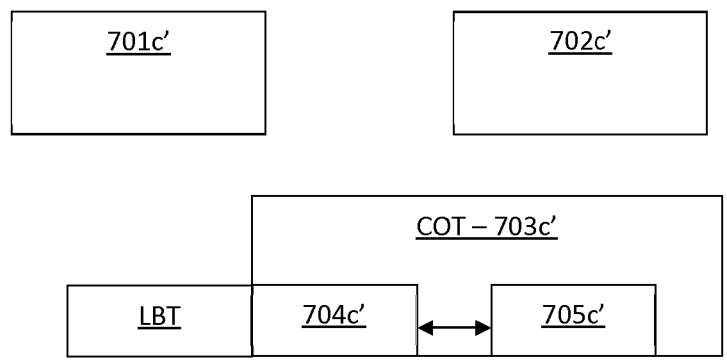

Type 2C procedures are illustrated with respect to FIGS. 7E and 7F (a+d in example). In these Type 2C examples, there is a gap between first and seconds transmissions made within a COT duration, where the gap is less than 16 μs. Type 2C procedures do not use an LBT mechanism prior to the second transmission being made.

FIG. 7E illustrates an initiating device 701*c* and a responding device 702*c*. The initiating device 701*c* determines that it is entitled to transmit signals to the responding device 702*c* during a COT window 703*c*. Within this COT window 703*c*, the initiating device 701*c* is configured to make both a first transmission 704c and a second transmission 705c to the responding device 702c. The time difference between the end of the first transmission 704c and the beginning of the second transmission is less than 16 μs.

FIG. 7F illustrates an initiating device 701c' and a responding device 702c'. The initiating device 701c' determines that it is entitled to transmit signals to the responding device 702c' during a COT window 703c'. Within this COT window 703c, the initiating device 701c' is configured to make a first transmission 704c' to the responding device and the responding device 702c' is configured to make a second transmission 705c' to the initiating device 701c'. The time difference between the end of the first transmission 704c' and the beginning of the second transmission is less than 16 μs.

In each of these examples, the initiating device may share its acquired COT with its intended receiver (i.e., with the responding device). For this purpose, the initiating device may inform (e.g. via control signaling) the responding device about the duration of this COT. The responding device may subsequently use this information to decide which type of LBT mechanism/duration the responding apply upon performing a transmission for which the intended receiver is the initiating device. In case the responding device transmission falls outside the COT, then the responding device may acquire a new COT using the LBT Type 1 with an appropriate CAPC. These concepts are illustrated with respect to FIG. 8.

Figure 8:
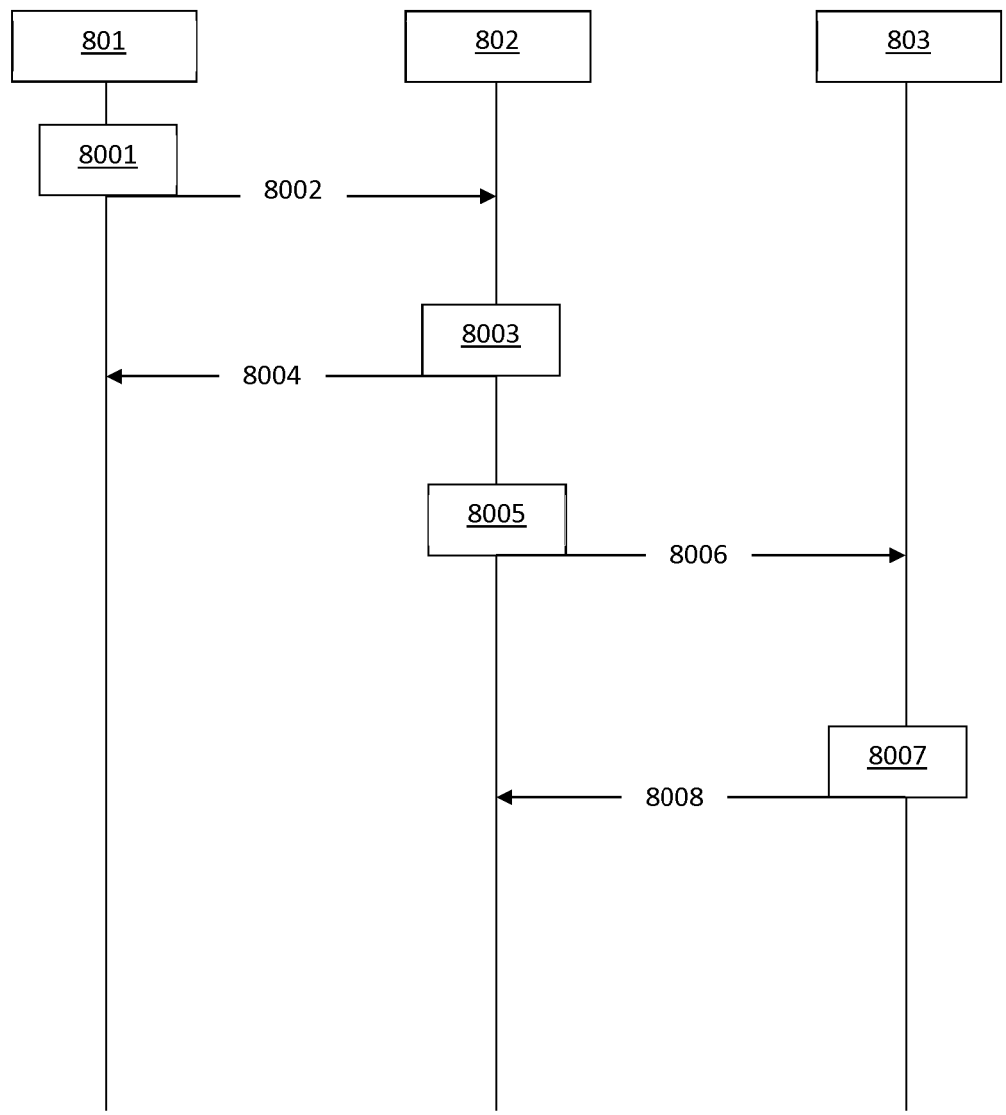
FIG. 8 illustrates signalling between different entities.

FIG. 8 illustrates signalling that may be performed between a first UE 801, a second UE 802, and a third UE 803.

During 8001, the first UE 801 determines that the first UE 801 will apply a type 1 LBT mechanism.

During 8002, the first UE 801 signals the second UE 802. This signalling of 8002 may be performed on a physical shared sidelink channel (PSSCH) and/or a physical sidelink control channel (PSCCH). This signalling of 8002 may comprise full information relating to the COT. The signalling of 8002 may comprise partial information relating to the COT. For example, the signalling of 8002 may indicate that the COT was acquired, and/or information that the COT has been obtained from somewhere else (e.g., a resource pool configuration and/or a radio resource control configuration for the interface between UEs).

During 8003, the second UE 802 determines that the second UE 802 will make a transmission according to a type 2 LBT mechanism.

During 8004, the second UE 802 signals the first UE 801. This signalling of 8004 may be performed on a physical sidelink feedback channel (PSFCH). All of the transmissions of 8002 and 8004 fall within a same channel occupation time duration.

During 8005, the second UE 802 determines that the second UE 802 will apply a type 1 LBT mechanism.

During 8006, the second UE 802 signals the third UE 803. This signalling of 8006 may be performed on a physical shared sidelink channel (PSSCH) and/or a physical sidelink control channel (PSCCH).

During 8007, the third UE 803 determines that the third UE 803 will make a transmission according to a type 2 LBT mechanism.

During 8008, the third UE 803 signals the second UE 802. This signalling of 8008 may be performed on a physical sidelink feedback channel (PSFCH). All of the transmissions of 8006 and 8008 fall within a same channel occupation time duration that is different to the COT duration associated with the signalling of 8004 and 8002.

SL transmissions are organized in frames identified by a respective direct frame number (DFN). The DFN enables a UE to synchronize the UE's radio frame transmissions according to a SL timing reference. UEs perform SL synchronization in order to have the same SL timing reference for SL communication among nearby UEs by synchronizing with a reference signal. There are at least five sources of synchronization references that may be used by the UE for sidelink synchronization. These include, for example, Global Navigation Satellite System (GNSS), New Radio Cell (e.g., a gNB), volved Universal Mobile Telecommunications System (UMTS) Terrestrial Radio Access Network (EUTRAN) Cell (e.g., an eNB), a SyncRef UE, and/or a UE's own internal clock. Here, a SyncRef UE is considered to be a UE acting as synchronization reference source to another UE. The SyncRef UE may be used in order to extend the synchronization coverage of a synchronization source (e.g., GNSS, gNB/eNB or another SyncRef UE by providing that synchronization information to another UE) or to simply use its own internal clock as the synchronization reference.

When a UE acts as a SyncRef UE, that UE may performs the transmission of a sidelink synchronization signal (S-SS)/Physical Sidelink Broadcast Channel (PSBCH) block. The S-SS may comprise at least one sidelink primary synchronization signal (S-PSS) and/or a sidelink secondary synchronization signal (S-PSS). The S-PSS, S-SSS, and the PSBCH signals/channel which may be mapped to symbols (such as, for example, as described in 3GPP TS 38.211).

The mapping may be performed as follows. In the time domain, an S-SS/PSBCH block may be considered as comprising $NN_{symb}^{S-SSB}$ Orthogonal Frequency Division Multiplex (OFDM) symbols, numbered in increasing order from 0 to $N_{symb}^{S-SSB}-1$ within the S-SS/PSBCH block, where S-PSS, S-SSS, and PSBCH with associated demodulation reference signal (DM-RS) are mapped to symbols as given by Table 2. The number of OFDM symbols in an S-SS/PSBCH block $NN_{symb}^{S-SSB}=13$ for normal cyclic prefix and $NN_{symb}^{S-SSB}=11$ for extended cyclic prefix. The first OFDM symbol in an S-SS/PSBCH block is the first OFDM symbol in the slot.

In the frequency domain, an S-SS/PSBCH block may be considered as comprising 132 contiguous subcarriers with the subcarriers numbered in increasing order from 0 to 131 within a sidelink S-SS/PSBCH block. The quantities k and l represent the frequency and time indices, respectively, within one sidelink S-SS/PSBCH block.

For an S-SS/PSBCH block, the UE may use antenna port 4000 for transmission of S-PSS, S-SSS, PSBCH and DM-RS for PSBCH, and use the same cyclic prefix length and subcarrier spacing for the S-PSS, S-SSS, PSBCH and DM-RS for PSBCH.

TABLE 2

Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
| --- | --- | --- |
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, . . . , $N_{symb}^{S-SSB} - 1$ | 0, 1, . . . , 131 |

TABLE 2-continued

Resources within an S-SS/PSBCH block
for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| Demodulation reference signal (DM-RS) for PSBCH | 0, 5, 6, . . . , $N_{symb}^{S-SSB} - 1$ | 0, 4, 8, . . . , 128 |

A UE may receive sidelink primary synchronization signals (S-PSS) and sidelink secondary synchronization signals (S-SSS) in order to perform synchronization procedures based on S-SS/PSBCH blocks. The UE may assume that reception occasions of a physical sidelink broadcast channel (PSBCH), S-PSS, and S-SSS are in consecutive symbols and form a S-SS/PSBCH block.

According to current 3GPP specifications, for the reception of a S-SS/PSBCH block, a UE may assume a frequency location corresponding to the subcarrier with index 66 in the S-SS/PSBCH block, is provided by sl-AbsoluteFrequencySSB. The UE may assume that a S-PSS symbol, a S-SSS symbol, and a PSBCH symbol have a same transmission power. The UE assumes a same numerology of the S-SS/PSBCH as for a sidelink bandwidth part of the S-SS/PSBCH block reception, and that a bandwidth of the S-SS/PSBCH is within a bandwidth of the sidelink bandwidth part (BWP). The UE may assume the subcarrier with index 0 in the S-SS/PSBCH block is aligned with a subcarrier with index 0 in a resource block of the sidelink bandwidth part.

In terms of the periodicity of the S-SS/PSBCH block, current 3GPP specifications describe that a UE is provided, by sl-NumSSB-WithinPeriod, a number $N_{period}^{S-SSB}$ of S-SS/PSBCH blocks in a period of 16 frames. The sl-NumSSB-WithinPeriod is provided within the SL-SyncConfig information element, which is an information element that configures synchronization-related parameters for sidelink communications. The sl-NumSSB-WithinPeriod indicates the number of sidelink SSB transmissions within one sidelink SSB period, and may take at least one set of applicable values are related to the subcarrier spacing (SCS) and frequency for the sl-NumSSB-WithinPeriod duration are, according to 3GPP TS 38.331, defined as follows:
  FR1, SCS=15 KHz: 1
  FR1, SCS=30 KHz: 1, 2
  FR1, SCS=60 KHz: 1, 2, 4
  FR2, SCS=60 KHz: 1, 2, 4, 8, 16, 32
  FR2, SCS=120 KHz: 1, 2, 4, 8, 16, 32, 64

Where "FR1" indicates a first frequency range, and "FR2" indicates a second frequency range.

The UE assumes that a transmission of the S-SS/PSBCH blocks in the period is with a periodicity of 16 frames. The UE determines indexes of slots that include S-SS/PSBCH block as $N_{period}^{S-SSB} + (N_{interval}^{S-SSB} + 1) \cdot i_{S-SSB}$, where
  index 0 corresponds to a first slot in a frame with SFN satisfying (SFN mod 16)=0
  $i_{S-SSB}$ is an S-SS/PSBCH block index within the number of S-SS/PSBCH blocks in the period, with $0 \leq i_{S-SSB} \leq N_{period}^{S-SSB} - 1$
  $N_{offset}^{S-SSB}$ is a slot offset from a start of the period to the first slot including S-SS/PSBCH block, provided by sl-TimeOffsetSSB
  $N_{interval}^{S-SSB}$ is a slot interval between S-SS/PSBCH blocks, provided by sl-timeInterval The relation among the number of SS-SS/PSBCH blocks per period, the starting time of the first SS-SS/PSBCH and the time offset between S-SS/PSBCH blocks is illustrated with respect to FIG. 9.

Figure 9:
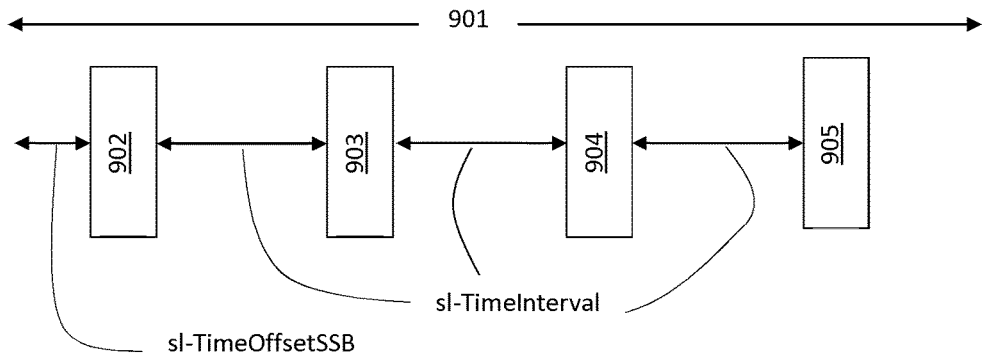
FIG. 9 illustrates time intervals and time offsets between scheduled synchronization opportunities.

FIG. 9 illustrates an S-SS/PSBCH period of duration 901 that comprises a first S-SS/PSBCH block 902, a second S-SS/PSBCH block 903, a third S-SS/PSBCH block 904, and a fourth S-SS/PSBCH block 905. The first S-SS/PSBCH block 902 is the first S-SS/PSBCH block to be transmitted since the beginning of the S-SS/PSBCH period started. The duration in time between the start of the S-SS/PSBCH period and the start of the first S-SS/PSBCH block 902 is labelled as the sl-TimeOffsetSSB. The duration in time between any S-SS/PSBCH block transmitted during the S-SS/PSBCH period duration 901 and a neighbouring S-SS/PSBCH block transmitted during the S-SS/PSBCH period duration 901 is labelled as sl-TimeInterval. In one example, the S-SS/PSBCH period duration may comprise 16 frames. In this case, the subcarrier spacing may comprise 60 kHz in FR1, which results in up to 4 S-SS/PSBCH blocks within the S-SS/PSBCH period duration 901.

To enable coexistence with other systems in unlicensed band, the S-SS/PSBCH design should consider the LBT channel access mechanism when performing synchronization. More specifically, the transmission of a S-SS/PSBCH block may be preceded by an LBT slot. A UE configured to act as a UESyncRef would then have to perform an LBT check to confirm if it can proceed with the transmission of the S-SS/PSBCH block.

However, whenever the LBT check fails, then as illustrated below with respect to FIG. 10, the UE configured to act as a UESyncRef will be unable to perform the transmission of the S-SS/PSBCH block. This results in a degradation of the synchronization performance.

Figure 10:
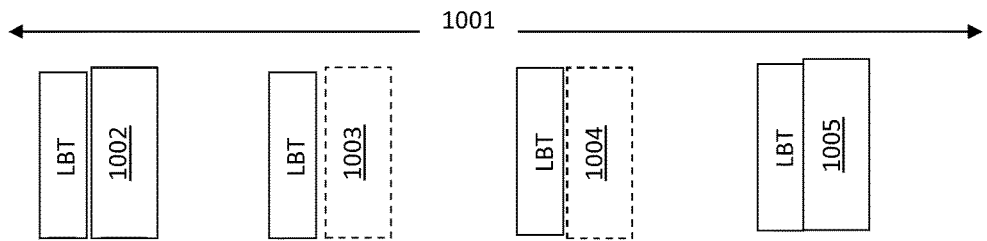
FIGS. 10 and 11 illustrates different listen-before-talk operations.

FIG. 10 illustrates an S-SS/PSBCH period of duration 1001 that comprises indications of when a first S-SS/PSBCH block 1002, a second S-SS/PSBCH block 1003, a third S-SS/PSBCH block 1004, and a fourth S-SS/PSBCH block 1005 are to be transmitted by a UE. Each of the S-SS/PSBCH blocks depicted is associated with a respective LBT duration. The LBT durations associated with the first and fourth S-SS/PSBCH blocks confirm that the UE is allowed to proceed with transmission of the first and fourth S-SS/PSBCH blocks. Therefore the first and fourth S-SS/PSBCH blocks are transmitted during their respective durations. The LBT durations associated with the second and third S-SS/PSBCH blocks confirm that the UE is not allowed to proceed with transmission of the second and third S-SS/PSBCH blocks. Therefore, the second and third S-SS/PSBCH blocks are not transmitted.

One way to mitigate against this (i.e., to increase robustness against LBT failures) is to increase the number of transmission opportunities. This means that when the UE suffers an LBT failure during one opportunity, then the UE has the chance to attempt additional LBT checks in the remaining opportunities. An example of this design principle applied to the S-SS/PSBCH block design is illustrated with respect to FIG. 11.

Figure 11:
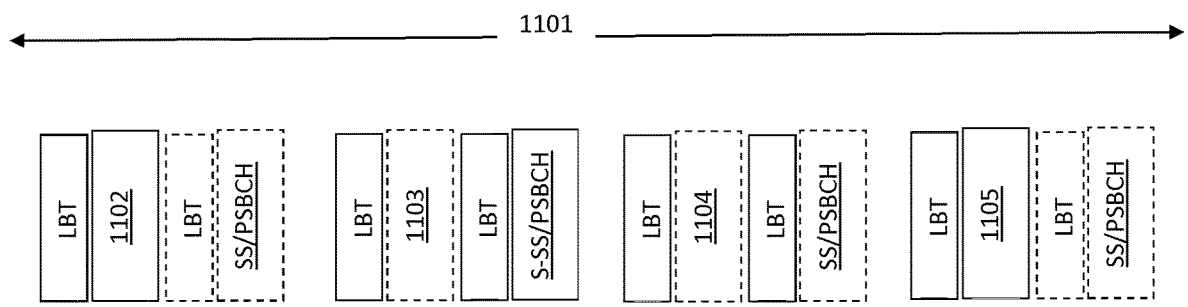

FIG. 11 illustrates an S-SS/PSBCH period of duration 1101 that comprises indications of when a first S-SS/PSBCH block 1102, a second S-SS/PSBCH block 1103, a third S-SS/PSBCH block 1104, and a fourth S-SS/PSBCH block 1105 are to be transmitted by a UE. Each of the S-SS/PSBCH blocks depicted is associated with a respective LBT duration. The LBT durations associated with the first and fourth S-SS/PSBCH blocks confirm that the UE is allowed to proceed with transmission of the first and fourth S-SS/

PSBCH blocks. Therefore the first and fourth S-SS/PSBCH blocks are transmitted during their respective durations. The LBT durations associated with the second and third S-SS/PSBCH blocks confirm that the UE is not allowed to proceed with transmission of the second and third S-SS/PSBCH blocks. Therefore, the second and third S-SS/PSBCH blocks are not transmitted immediately after their associated LBT is failed. Instead, each of the second and third S-SS/PSBCH blocks has a second (i.e., further) LBT duration associated therewith. In this example, after the second LBT check performed for the second S-SS/PSBCH block 1103 indicates that an S-SS/PSBCH block transmission may be made (and so is made), while the second LBT check performed for the third S-SS/PSBCH block 1104 indicates that an S-SS/PSBCH block may not be transmitted (and so the third S-SS/PSBCH block is not transmitted).

However, as discussed above, even when an S-SS/PSBCH block occupies only 11 Physical Resource Blocks (PRBs) of the sidelink bandwidth part, all the remaining PRBs in the slot where the S-SS/PSBCH block takes place cannot be used by any other sidelink transmission. This is illustrated with respect to FIG. 12. Currently, a physical resource block is defined as a block of 12 consecutive subcarriers over which the transmissions are scheduled within a slot. 5G NR physical layer uses time-frequency resource (physical resource block) for transmission.

Figure 12:
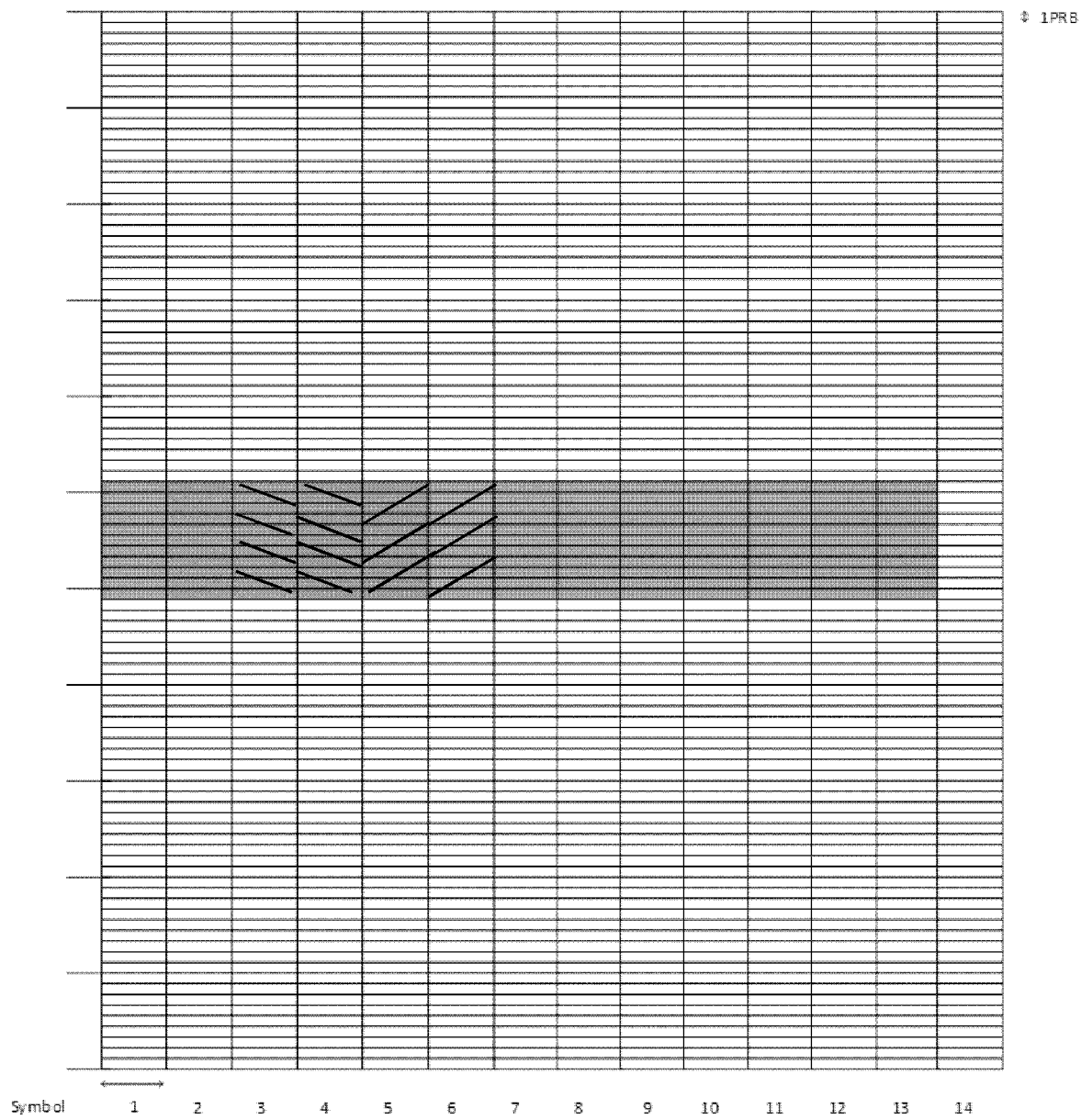
FIG. 12 illustrates resource space usage.

FIG. 12 illustrates individual PRBs along the y axis and symbols along the x axis. As shown in FIG. 12, the first and sixth to thirteenth symbols comprise physical resources used for the PSBCH, the second to third symbols comprise physical resources used for the S-PSS, and the fourth to fifth symbols comprise physical resources used for the S-SSS.

The reason for this design is to ensure that when UEs are performing their search for a synch source, the UEs can detect the S-PSS and S-SSS signals more easily, since the S-SS/PSBCH block is the only signal present in the SL bandwidth part.

The introduction of additional S-SS/PSBCH block opportunities to increase robustness towards LBT failures is done at the cost of the reduction of resources available for sidelink communication. There is therefore the need for alternative approaches that enable robustness towards LBT failures, without impacting the number of usable resources for SL communications.

The following aims to address at least one of the above mentioned issues. In particular, the following aims to increase robustness against LBT check failures associated with synchronization signal transmissions (e.g., in S-SS/PSBCH block transmissions). The following further aims to minimize resource penalties associated with introducing multiple S-SS/PSBCH block transmission occasions.

The following introduces a primary secondary S-SS/PSBCH block occasion and at least one secondary S-SS/PSBCH block occasion, where the secondary S-SS/PSBCH block is overlapped in time with at least one resource pool, while the primary S-SS/PSBCH block occurs by itself in the sidelink bandwidth part. The primary and secondary S-SS/PSBCH block occasions may be configured as part of the sidelink bandwidth part configuration.

In more detail, in baseline schemes, when the S-SS/PSBCH block currently occurs during a time period, then no other resources in other frequencies can be used for other purposes during that same time period. This means that, currently, no sidelink communication takes place in a frequency division multiple access (FDMA) manner when a synchronization signal is being transmitted. Therefore, time-frequency resources used for synchronization (also referred to herein as "synchronization resources" and/or resource pool for synchronization) have no overlap with any resource pool.

The present application proposes that while this same baseline is applied for a primary synchronization signal transmission, when this primary synchronization signal cannot be transmitted during its allocated synchronization resources, at least a secondary synchronization signal may transmitted instead. However, the resources associated with transmission of the secondary synchronization signal may differ from the resources associated with transmission of the primary synchronization signal in that, for the secondary synchronization signal, the sidelink communications may still be scheduled for the time period allocated for the transmission of the secondary synchronization signal. In other words, the resources in the frequency domain surrounding the secondary synchronization signal may be used for sidelink communications. Therefore, it is possible to have sidelink communication resource pools overlapped in time with the resource pool for synchronization signal transmission.

The time resources corresponding to the secondary S-SS/PSBCH block may be excluded in a dynamic way from the overlapped resource pool when the UESyncRef was unable to transmit the S-SS/PSBCH block on the primary S-SS/PSBCH block resources. Conversely, when the UESyncRef is able to transmit the S-SS/PSBCH block on the primary S-SS/PSBCH block resources, the secondary S-SS/PSBCH block is not excluded from the overlapped resource pool.

The time and frequency resources corresponding to the secondary S-SS/PSBCH block may be excluded from the resource pool permanently or conditionally. Conditional exclusion will be discussed further below.

In the presently described system, when the LBT check associated with the primary S-SS/PSBCH is successful, the UESyncRef transmits in the primary S-SS/PSBCH block. As the primary S-SS/PSBCH block transmission was successful, then the UEs operating in the vicinity of the UESyncRef are allowed to transmit in the sub-channels surrounding the secondary S-SS/PSBCH block when they can detect that a UESyncRef transmission was made in the primary S-SS/PSBCH block.

When a non-UESyncRef UE was unable to detect the UESyncRef transmission, then the non-UESyncRef UE may drop any transmissions planned to occur in the sub-channels surrounding the secondary S-SS/PSBCH blocks.

Further, when a UESyncRef UE was unable to transmit in the primary S-SS/PSBCH due to LBT failure and was able to detect the transmission of another UESyncRef UE in the primary S-SS/PSBCH block, then the UESyncRef UE will not proceed with the attempt to use the secondary S-SS/PSBCH block resources. This is useful as the UESyncRef UE that was unable to transmit will not attempt a retransmission when non-UESyncRef UEs are likely to be transmitting, which reduces the likelihood of interference in the environment.

The time and frequency resources of the resource pool overlapped with the secondary S-SS/PSBCH blocks may be reserved by default (i.e. excluded from the resource pool) while the remaining subchannels can be used for PSCCH/PSSCH and PSFCH. This may be achieved in at least one a plurality of different ways.

In at least one example, the resource pool configuration may state explicitly the time and frequency resources that are excluded due to overlap with secondary S-SS/PSBCH blocks.

In another example, the sidelink bandwidth part configuration may state explicitly the time and frequency resources where the secondary S-SS/PSBCH block take places. The UEs may implicitly exclude these resources from the resource pool.

In another example, only the specific Physical Resource Blocks that overlap with the S-SS/PSBCH block are not used for PSCCH/PSSCH transmissions. In other words, the sub-channel Physical Resource Blocks are rate matched around the S-SS/PSBCH blocks.

In another example, only the physical resource blocks that overlap with the S-SS/PSBCH block are not used for transmissions on the PSFCH.

Figure 13:
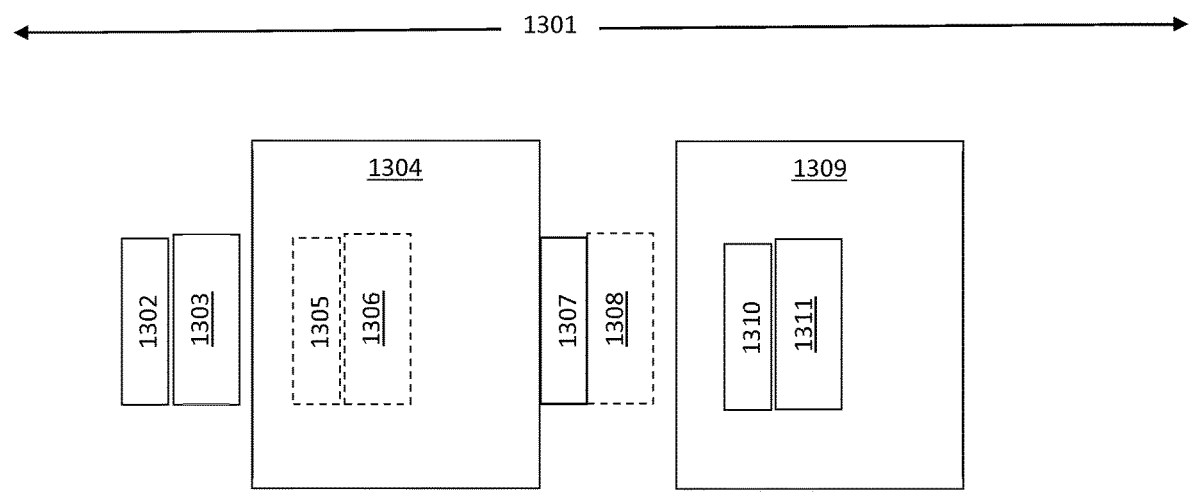
FIG. 13 illustrates example listen-before talk operation.

FIG. 13 illustrates how, when the LBT check associated with the primary S-SS/PSBCH fails, then the UESyncRef will reattempt the LBT check in the secondary S-SS/PSBCH block occasion. In this case, all UEs upon not receiving the UESyncRef transmission in the primary S-SS/PSBCH block occasion will drop any transmissions planned to occur in the sub-channels surrounding the secondary S-SS/PSBCH blocks.

FIG. 13 illustrates a S-SS/PSBCH period 1301. This S-SS/PSBCH period may comprise 16 frames. The S-SS/PSBCH period may comprise a first primary LBT check 1302. As this first primary LBT check 1302 is determined to be successful, the first primary LBT check 1302 is followed by a first primary S-SS/PSBCH block 1303 transmission. This first primary S-SS/PSBCH block 1303 is succeeded by a first resource pool 1304. As the first primary S-SS/PSBCH block 1303 was successfully transmitted, the resources in the first resource pool 1304 may be used for sidelink transmissions by at least neighbouring UE. The resources in the first resource pool 1304 may not be used for a first secondary LBT check 1305 and/or a first secondary S-SS/PSBCH block transmission 1306, and so the resources surrounding those allocated for the first secondary LBT check 1305 and the first secondary S-SS/PSBCH block transmission 1306 (i.e., those resources in the same symbol and the resources allocated for the first secondary LBT check 1305 and the first secondary S-SS/PSBCH block transmission 1306) may be used for transmissions by at least one neighbouring UE for sidelink communications.

FIG. 13 further illustrates that the S-SS/PSBCH period 1301 comprises a first secondary LBT check 1307. As this first secondary LBT check 1307 is determined to be unsuccessful, the first secondary LBT check 1307 is not followed by a first secondary S-SS/PSBCH block transmission 1308. The resources allocated for this first secondary S-SS/PSBCH block transmission 1308 is succeeded by a second resource pool 1309. As the first secondary S-SS/PSBCH block 1308 was not transmitted successfully, the resources in the second resource pool 1309 may be used for sidelink transmissions by at least neighbouring UE. However, the resources in the second resource pool 1309 are also used for a second secondary LBT check 1310 (which is shown as successful in this example) and/or a second secondary S-SS/PSBCH block transmission 1311. Therefore, the resources surrounding those allocated for the second secondary LBT check 1310 and the second secondary S-SS/PSBCH block transmission 1311 (i.e., those resources in the same symbol as the resources allocated for the second secondary LBT check 1310 and the second secondary S-SS/PSBCH block transmission 1311) may not be used for transmissions by at least one neighbouring UE for sidelink communications.

Figure 14:
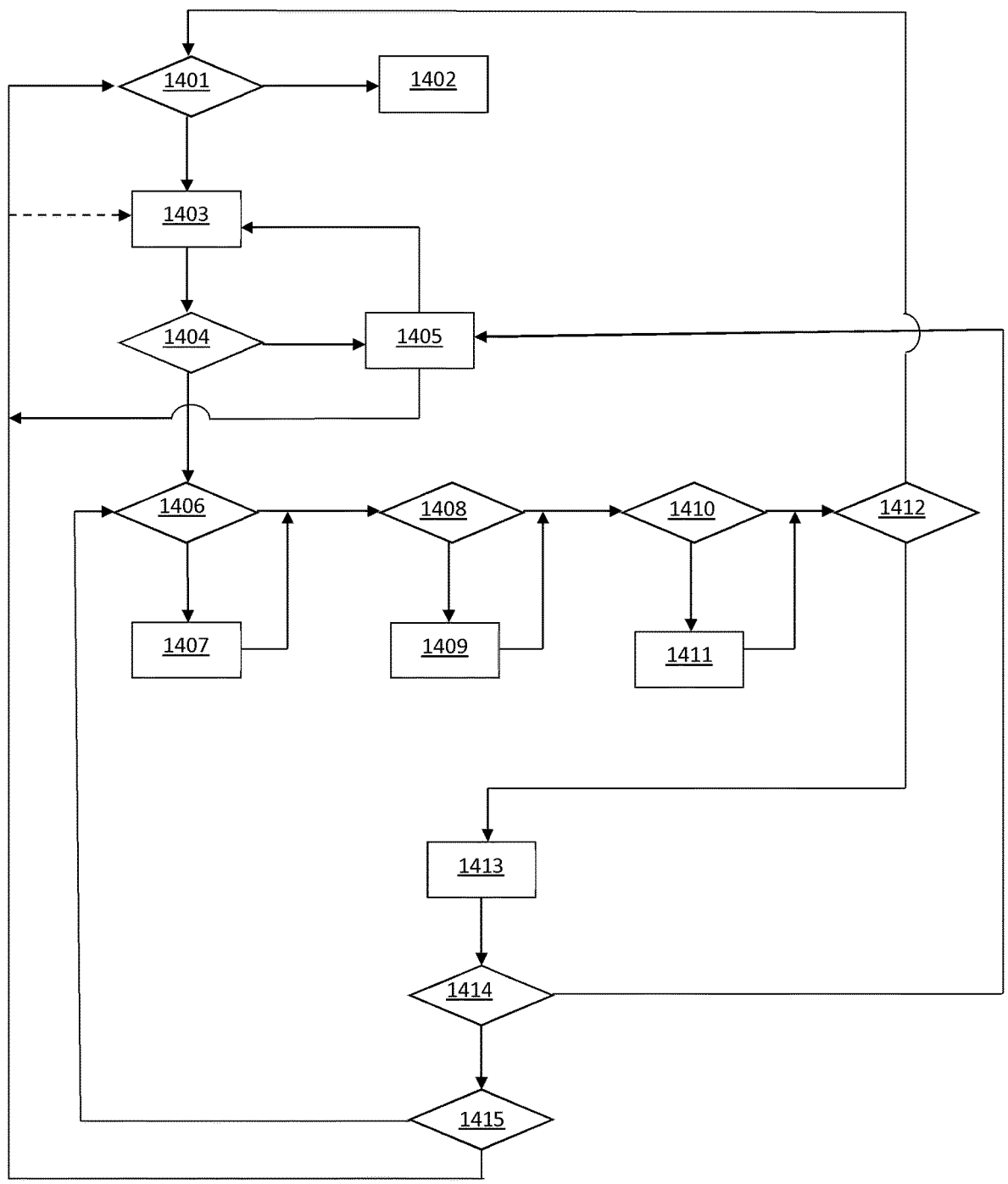
FIGS. 14 to 17 illustrate example operations that may be performed by apparatus described herein.

To illustrate this further, example operations of the UESyncRef Tx are illustrated with respect to FIG. 14. These operations of FIG. 14 may be performed by a UE.

At 1401, the UE determines whether the current network conditions are such that the UE should act as a UESyncRef. For example, the UE may be configured to act as a UESyncRef when the UE detects an absence of other primary synchronization sources (such as, for example GNSS/NW), when the UE detects that any primary synchronization source transmissions fall below a configured threshold (e.g., with respect to a received signal power), and/or the absence of another UESyncRef in the nearby vicinity.

When the UE determines during 1401 that the UE is not configured to act as a UESyncRef, the UE proceeds to 1402.

During 1402, the UE acquires synchronization from an external source (such as a UESyncRef). Further, the UE acts as a non-UESyncRef UE.

When the UE determines during 1401 that the UE is configured to act as a UESyncRef and is able to act as a UESyncRef, the UE proceeds to 1403.

During 1403, the UE performs an LBT operation associated with a primary sidelink synchronization signal and/or PSBCH block. The UE proceeds to 1404 after 1403 is completed.

The LBT operation may be, for example, a Type 1 or a Type 2 LBT process for accessing a primary S-SS/PSBCH block resource for transmitting a sidelink synchronization signal.

In one example, the LBT applied prior to transmission of primary S-SS/PSBCH is of type 2A (i.e. 25 microsecond single-shot LBT).

During 1404, the UE determines whether the LBT operation of 1403 was successful or not. The LBT operation of 1403 is determined to be successful when the UE determines that the UE has the right to transmit an S-SS/PSBCH block (e.g., when the UE detects no transmissions above a predetermined power level have been made within a predetermined time period, where the power level and time period may be configured in the UE).

When the UE determines that the LBT operation of 1403 was successful, the UE proceeds to 1405.

During 1405, the UE transmits an S-SS/PSBCH block. Subsequent to this, the UE returns to 1403 and performs 1403 (and any subsequent operations) in respect of another primary S-SS/PSBCH block.

When the UE determines that the LBT operations of 1403 was unsuccessful, the UE proceeds to 1406.

During 1406, the UE determines whether the UE will transmit PSCCH/PSCCH in the resources assigned for the next available secondary S-SS/PSBCH. In other words, the UE determines whether there is a next available secondary S-SS/PSBCH set of resources.

When 1406 is determined in the positive, the UE proceeds to 1407.

At 1407, the UE triggers resource selection to identify a new resource for its PSCCH/PSSCH transmission. Subsequent to 1407, the UE proceeds to 1408.

When 1406 is determined in the negative, the UE proceeds to 1408.

During 1408, the UE determines whether the UE is scheduled to provide feedback (e.g., Hybrid Automatic Repeat Request (HARQ)) during the resources assigned for the next available secondary S-SS/PSBCH.

When 1408 is determined in the positive, the UE proceeds to 1409.

At 1409, the UE abstains from transmitting this feedback. Subsequent to 1409, the UE proceeds to 1410.

When 1408 is determined in the negative, the UE proceeds to 1410.

During 1410, the UE determines whether the selected PSCCH/PSSCH resource has an associated feedback slot available in the slot of the next available secondary S-SS/PSBCH.

When 1410 is determined in the positive, the UE proceeds to 1411.

During 1411, the UE does not request feedback (e.g., HARQ feedback) in respect of transmission made (or to be made) by the UE. Although 1411 is shown as terminating, the UE may return to 1403 in respect of a next primary S-SS/PSBCH block. The UESyncRef may, when also taking the role of a transmitter, have a PSCCH/PSSCH transmission which has a feedback resource (e.g., on a PSFCH) mapped in time to the time resources where the secondary S-SS/PSBCH block will take place.

When 1410 is determined in the negative, the UE proceeds to 1412.

During 1412, the UE determines whether another UESyncRef transmission was detected during the resources assigned for the primary S-SS/PSBCH block resource. Although not shown, when another UESyncRef transmission was detected, the UE proceeds to 1401.

When another UESyncRef transmission was not detected, the UE proceeds to 1413.

During 1413, the UE performs an LBT mechanism in a secondary S-SS/PSBCH block. After 1413 has been performed, the UE proceeds to 1414.

During 1414, the UE determines whether the LBT mechanism of 1413 was successful. This may be assessed using the same, or similar, criteria, to that discussed in relation to 1404.

For example, the LBT applied prior to transmission of secondary S-SS/PSBCH may be of type 2A (i.e. 25 microsecond single-shot LBT) for the first N secondary S-SS/PSBCH occasions within an S-SSB period of 160 ms, and for further secondary S-SS/PSBCHs Type 1 LBT may be used. The value of N may be chosen such that the total amount of primary and secondary S-SSB occasions using Type 2A LBT does not exceed 5% of the time (8 ms within a 160 ms S-SSB period).

When it is determined during 1414 that the LBT mechanism of 1413 was successful, the UE proceeds to 1405.

When it is determined during 1414 that the LBT mechanism of 1413 was unsuccessful, the UE proceeds to 1415.

During 1415, the UE determines whether any other secondary S-SS/PSBCH blocks are available for transmission.

When it is determined during 1415 that there are other secondary S-SS/PSBCH blocks available, the UE proceeds to 1406.

When it is determined during 1415 that there are no other secondary S-SS/PSBCH available, the UE returns to 1401 and/or 1403 (depending on whether or not the UE has another primary S-SS/PSBSCH block to transmit).

Figure 15:
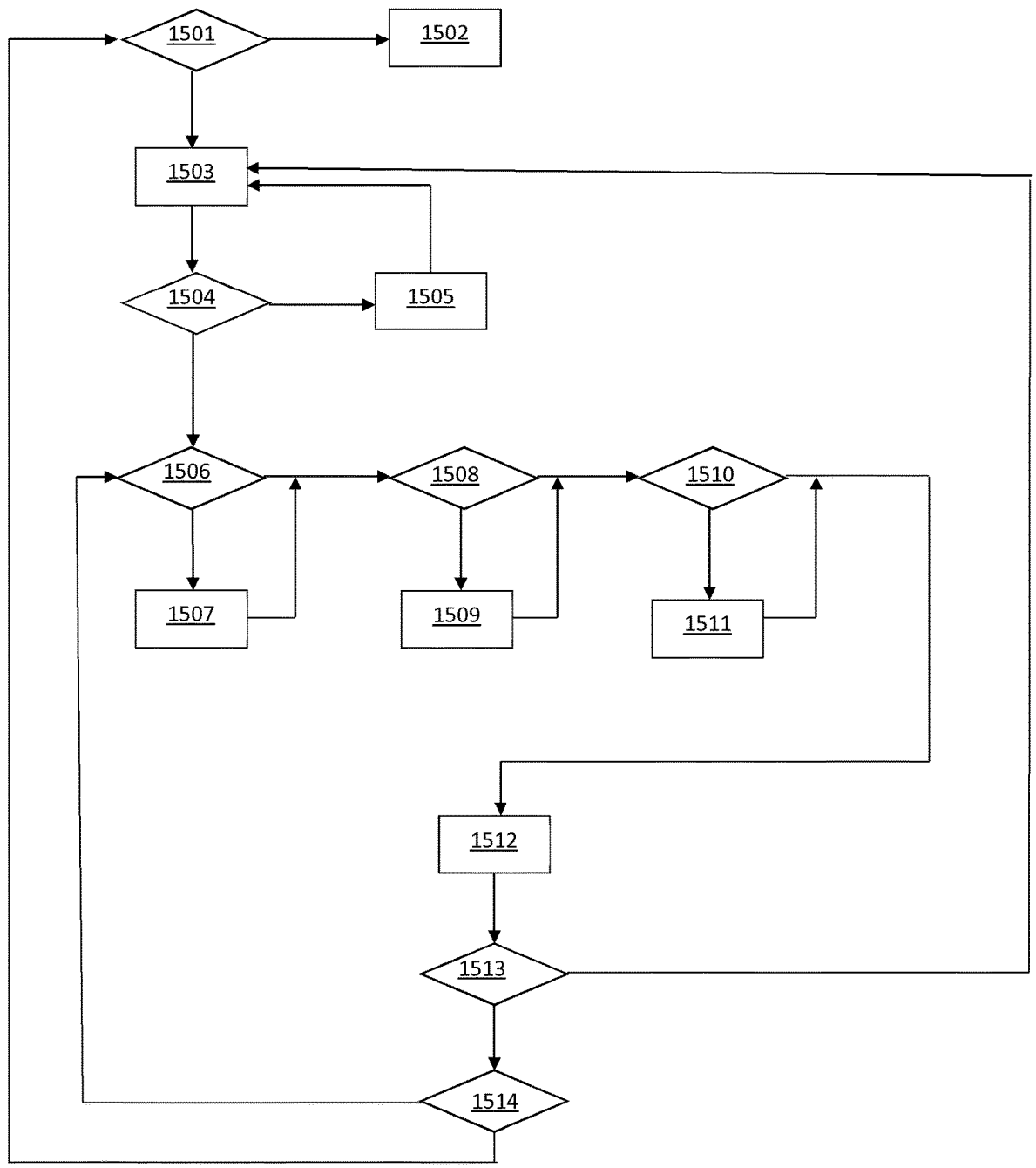

FIG. 15 illustrates operations that may be performed by a (non-UESyncRef) UE configured to receive transmissions of the UESynchRef UE performing the operations of FIG. 14.

At 1501, the UE determines whether the conditions are fulfilled for the UE to act as a UESyncRef. For example, the UE may be configured to act as a UESyncRef when the UE detects an absence of other primary synchronization sources (such as, for example GNSS/NW), when the UE detects that any primary synchronization source transmissions fall below a configured threshold (e.g., with respect to a received signal power), and/or the absence of another UESyncRef in the nearby vicinity.

When the conditions are fulfilled, the UE proceeds to 1502. At 1502, the UE moves to perform 1402 of FIG. 14. In other words, at 1502, the UE acts as a UESyncRef.

When the conditions are not fulfilled, the UE proceeds to 1503.

At 1503, the UE monitors at least one resource assigned/allocated for the primary S-SS/PSBCH block.

At 1504, the UE determines whether a UESyncRef transmission has been detected on the primary S-SS/PSBCH resources being monitored.

When a UESyncRef transmission was detected, the UE proceeds to 1505.

During 1505, the UE may use time and frequency resources overlapping with the secondary S-SS/PSBCH block(s). This may be dependent on at least criteria being fulfilled. For example, the non-UESyncRef UE may select to use the time and frequency resources associated with the secondary S-SS/PSBCH block if the UESyncRef transmission received in the primary S-SS/PSBCH block has a received signal power that is above a configured reference signal received power (RSRP) threshold. From 1505, the UE proceeds to 1503.

When a UESyncRef transmission was not detected, the UE proceeds to 1506.

During 1506, the UE determines whether the UE is configured to transmit PSCCH/PSSCH in the resources (e.g., time and/or frequency resources) currently scheduled for the next sidelink S-SS/PSBCH block transmission.

When the UE is so configured, the UE proceeds to 1507.

During 1507, the UE triggers resource selection for transmission of sidelink transmissions (e.g., PSCCH/PSSCH transmission). In other words, the UE selects resources for PSCCH/PSSCH transmissions that do not overlap with the resources allocated/assigned for the next sidelink S-SS/PSBCH from the UESyncRef. After 1507, the UE proceeds to 1508.

When the UE is not so configured, the UE proceeds to 1508.

During 1508, the UE determines whether the UE is configured to provide feedback (e.g., HARQ feedback) relating to previous sidelink transmissions from the UESyncRef using the resources (e.g., time and/or frequency resources) currently scheduled for the next sidelink S-SS/PSBCH block transmission.

When the UE is so configured, the UE proceeds to 1509. During 1509, the UE determines not to provide the configured feedback to the UESyncRef. After 1509, the UE proceeds to 1510.

When the UE is not so configured, the UE proceeds to 1510.

During 1510, the UE determines whether the UE selected resources for the sidelink transmission discussed above in respect of 1506 is associated with feedback that is to be provided in the same resources (e.g., time and/or frequency resources) of the currently scheduled for the next sidelink S-SS/PSBCH block transmission.

When the UE determines that the UE is so associated, the UE proceeds to 1511. During 1511, the UE determines not to request feedback for those sidelink transmissions. After 1511, the UE proceeds to 1512.

When the UE determines that the UE is not so configured, the UE proceeds to 1512.

During 1512, the UE monitors the resources assigned/allocated for the next secondary S-SS/PSBCH block transmission from the UESyncRef. The UE subsequently proceeds to 1513.

During 1513, the UE determines whether an S-SS/PSBCH block transmission was received from the UESyncRef. This may be determined in dependence on at least one criteria. For example, the non-UESyncRef UE may determine that a UESyncRef transmission has been received when a transmission in the secondary S-SS/PSBCH block has a received signal power that is above a configured reference signal received power (RSRP) threshold. This configured threshold may be the same or different to configured RSRP threshold used for determining whether a transmission was made in the primary S-SS/PSBCH block.

When it is determined that an S-SS/PSBCH block transmission was received, the UE proceeds to 1503.

When it is determined that an S-SS/PSBCH block transmission was not received, the UE proceeds to 1514.

During 1514, the UE determines whether there are any other resources assigned/allocated for secondary S-SS/PBSCH transmission from the UESyncRef.

When it is determined that there are no further resources assigned/allocated, the UE proceeds to 1501.

When it is determined that there are further resources assigned/allocated, the UE proceeds to 1506.

Figure 16:
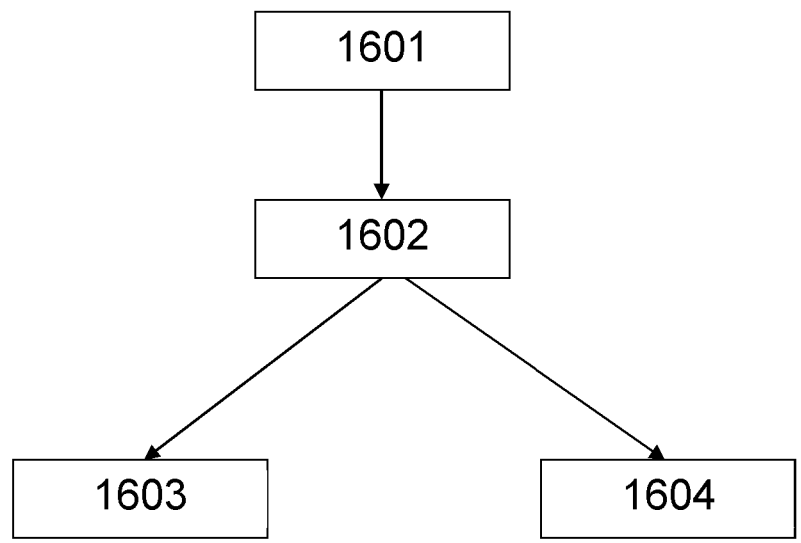
Figure 17:
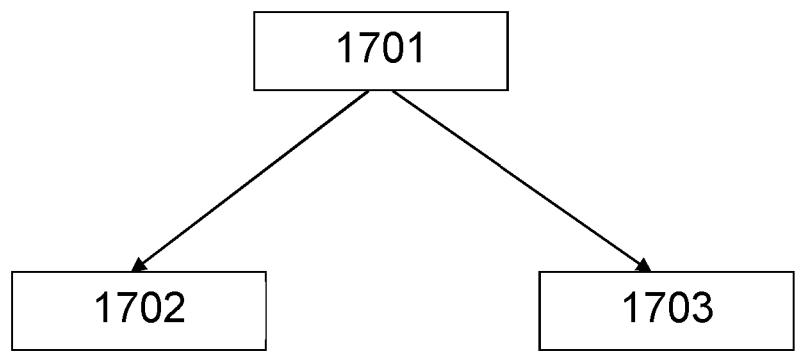

FIGS. 16 and 17 illustrate operations that may be performed by apparatus described herein, and highlight aspects discussed in the above examples. It is therefore understood that features discussed in the above examples may also be performed by the apparatus described in FIGS. 16 and 17. Further, the apparatus of FIG. 16 may interact with the apparatus of FIG. 17.

FIG. 16 illustrates operations that may be performed by a first user equipment. The first user equipment may be a UESyncRef UE.

At 1601, the apparatus determines to provide at least one synchronization signal for sidelink communications to a second user equipment. The at least one synchronization signal may be, for example, a PSBSCH signal and/or an SS.

At 1602, the apparatus determines whether to transmit a synchronization signal using a first set of synchronization resources. The first set of synchronization resources may be resources that are specifically designated for transmitting a synchronization signal. The first set of synchronization resources may occupy at least one time slot such that sidelink communications are not scheduled for transmission and/or reception during that at least one time slot. In other words, the resources allocated for sidelink communications are not coincident in time with the first set of synchronization resources.

At 1603, when it is determined to transmit the synchronization signal, the apparatus abstains from transmitting a synchronization signal using a second set of synchronization resources. The apparatus may further abstain from transmitting and/or receiving sidelink communications using the first set of communication resources. The apparatus may further be allowed to transmit and/or receive sidelink communications using physical communication resources that are coincident in time with the second set of synchronization communication resources. This means that the apparatus (and/or neighbouring UEs) may transmit and/or receive sidelink communications using physical communication resources that are coincident in time with the second set of synchronization communication resources.

At 1604, when it is determined to abstain from transmitting the synchronization signal in the first set of synchronization resources, the apparatus may determine whether to transmit the synchronization signal using the second set of synchronization resources; and abstain from using any resource (e.g., any physical communication resource, such as a time-frequency resource) coinciding in time with the second set of synchronization resources for transmitting and/or receiving a first sidelink communication.

When it is determined to abstain from transmitting the synchronization signal, the apparatus may further select a first set of communication resources for transmitting the first sidelink communication that does not coincide in time with the second set of synchronization resources in response to determining that the first user apparatus intends to transmit the first sidelink communication during the second set of synchronization resources; and use the first set of communication resources for transmitting the first sidelink communication.

When it is determined to abstain from transmitting the synchronization signal, the apparatus may determine that the first user apparatus intends to, during the second set of synchronization resources, transmit first feedback in respect of a received second sidelink communication; and abstain from transmitting the first feedback during the second set of synchronization resources in response to the determination. The abstaining may result in the first feedback never being transmitted. The abstaining may result in the first feedback being transmitted in an alternative physical communication resource.

When it is determined to abstain from transmitting the synchronization signal, the apparatus may determine that the first user apparatus intends to request to receive second feedback in respect of a third sidelink communication, with the second feedback being expected to be received during the second set of synchronization resources, and abstain from requesting the second feedback.

The determining whether to transmit the synchronization signal may comprise, when it is determined that a synchronization signal was received from another user equipment during the first set of synchronization resources, abstaining from transmitting the synchronization signal during the second set of synchronization resources; and when it is determined that a synchronization signal was not received from another user equipment during the first set of synchronization resources, determining whether the first user equipment is allowed to transmit the synchronization signal during the second set of synchronization resources.

The determining whether the first user equipment is allowed to transmit the synchronization signal may comprise performing a listen before talk operation.

When it is determined that the synchronization signal was not transmitted in the second set of synchronization resources by the first user equipment, the apparatus may determine whether to transmit a synchronization signal using a third set of synchronization resources.

The determining whether to transmit the synchronization signal using the first set of synchronization resources may comprise performing a listen before talk operation to determine whether the first user equipment is allowed to transmit the synchronization signal.

FIG. 17 illustrates operations that may be performed by an apparatus for a second user equipment. The second user equipment may be a non-UESyncRef. The second user equipment may interact with the first user equipment of FIG. 16.

At 1701, the apparatus determines whether a synchronization signal has been received during a first set of synchronization resources.

When it is determined the synchronization signal was received, at 1702 the apparatus determines that the apparatus is allowed to use communication resources during a second set of synchronization resources for a first sidelink communication. In other words, the apparatus may further be allowed to transmit and/or receive sidelink communications using physical communication resources that are coincident in time with the second set of synchronization communication resources. This means that the apparatus (and/or neighbouring UEs) may transmit and/or receive sidelink communications using physical communication resources that are coincident in time with the second set of synchronization communication resources.

When it is determined the synchronization was not received, at 1703 the apparatus abstains from using the communication resources during the second set of synchronization resources for a first sidelink communication; and monitors the second set of synchronization resources for a synchronization signal.

When it is determined to abstain from using the second set of synchronization resources for the first sidelink communication, the apparatus may select a first set of communication resources for transmitting and/or the first sidelink communication that are not coincident in time with the second set of synchronization resources. The apparatus may use at least one communication resource in this first set of communication resources for transmitting and/or receiving a sidelink communication with a neighbouring UE.

The apparatus may, when it is determined to abstain from using the second set of synchronization resources for the first sidelink communication: determine that the second user apparatus intends to transmit first feedback in respect of a received second sidelink communication during the second set of synchronization resources; and abstain from transmitting the first feedback during the second set of synchronization resources in response to the determination. The abstaining may result in the first feedback never being transmitted. The abstaining may result in the first feedback being transmitted in an alternative physical communication resource.

When it is determined to abstain from using the second set of synchronization resources for the first sidelink communication, the apparatus may determine that the second user apparatus intends to request to receive second feedback in respect of a third sidelink communication, with the second feedback being expected to be received during the second set of synchronization resources; and abstain from requesting the second feedback.

The apparatus may, when it is determined that the secondary synchronization signal was not received by the second user equipment during the second synchronization resources, abstain from using a tertiary set of synchronization resources for the first sidelink communication.

The determining whether the synchronization signal has been received during the first set of synchronization resources may comprise: determining a power of signals received during the first set of synchronization resources; comparing the power to a threshold power value; and determining that the synchronization signal has been received during the first set of synchronization resources when the power equals and/or exceeds the threshold power value; and determining that the synchronization signal has not been received during the first set of synchronization resources when the power is less than the threshold power value. The determined power may, depending on the implementation, be a maximum received power of signals received during the first set of synchronization resources. The determined power may be an average power of signals received during at least part of the first set of synchronization resources. The determined power may be an average power of signals received during the whole duration of the first set of synchronization resources.

In all of the above, the synchronization resources may be time-frequency resources. Further, it is understood that reference in the above to "primary" and "secondary" synchronization signals does not imply that the form of those synchronization signals differ from each other. In other words, the form of the "primary" synchronization signal may be identical to the form of the "secondary" synchronization signal. In other words, except for being associated with different resources for transmission, the primary and secondary synchronization signals may be the same.

Figure 2:
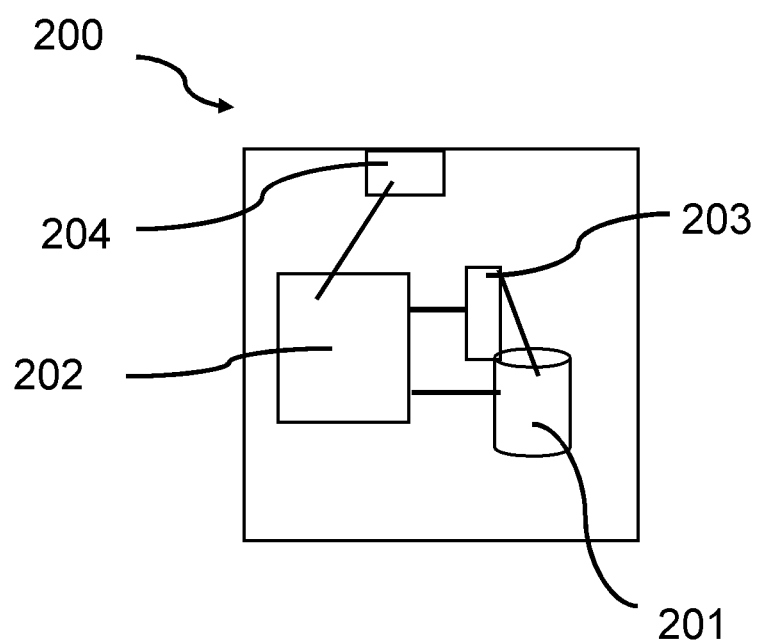
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR, and so forth. The control apparatus may be integrated with or external to a node or module of a core network or RAN. In some examples, base stations comprise a separate control apparatus unit or module. In other examples, the control apparatus can be another network element, such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example, the control apparatus 200 or processor 201 can be configured to execute an appropriate software code to provide the control functions.

Figure 3:
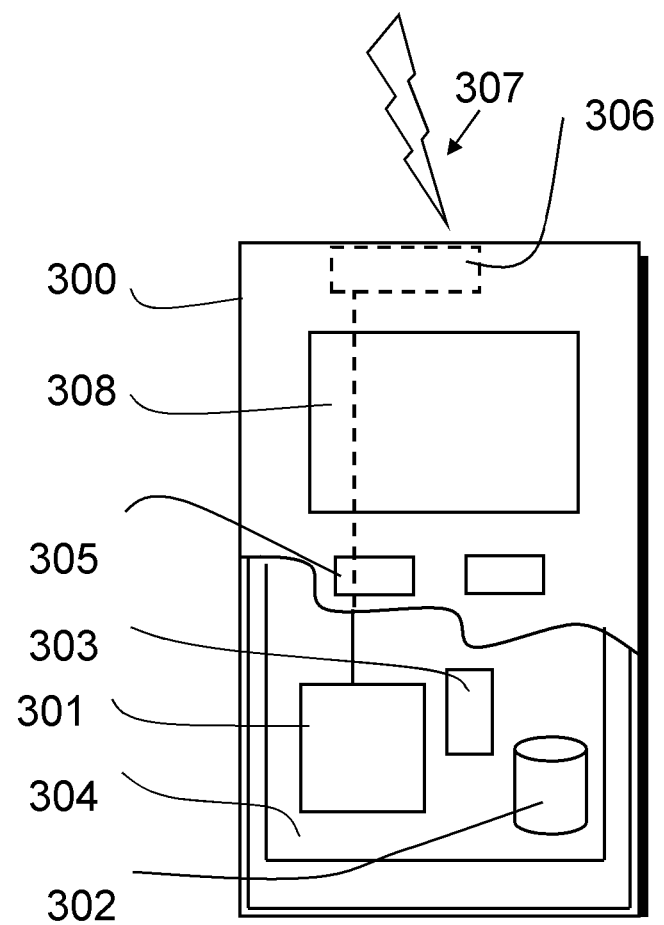
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is referred to as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. As described herein, the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3, a transceiver apparatus is designated schematically by block 306. The transceiver apparatus 306 may be provided, for example, by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 304. The user may control the operation of the wireless device by means of a suitable user interface such as keypad 305, voice commands, touch sensitive screen or pad, combinations thereof or the like. A display 308, a speaker and a microphone can be also provided. Furthermore, a wireless communication device may comprise appropriate connectors (either wired or' wireless) to other devices and/or for connecting external accessories, for example hands-free equipment, thereto.

Figure 4:
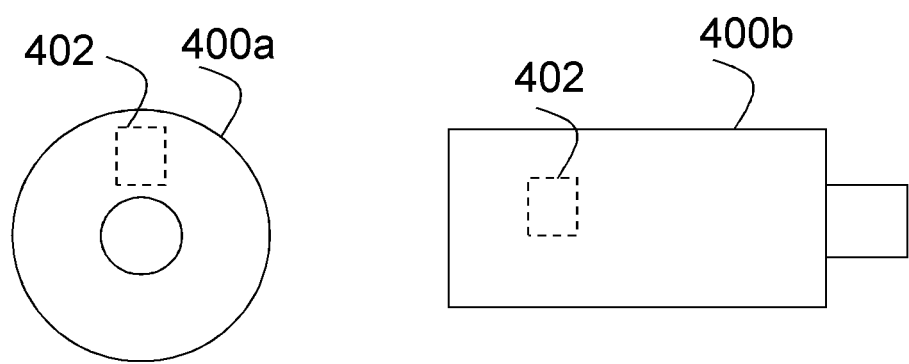
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 16 and/or FIG. 17, and/or methods otherwise described previously.

As provided herein, various aspects are described in the detailed description of examples and in the claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIG. 16 and/or FIG. 17, and/or otherwise described previously, may represent program steps, or interconnected logic circuits, blocks and functions, or a combination of program steps and logic circuits, blocks and functions. The software may be stored on such physical media as memory chips, or memory blocks implemented within the processor, magnetic media (such as hard disk or floppy disks), and optical media (such as for example DVD and the data variants thereof, CD, and so forth).

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (AStudy ItemC), gate level circuits and processors based on multi-core processor architecture, as nonlimiting examples.

Additionally or alternatively, some examples may be implemented using circuitry. The circuitry may be configured to perform one or more of the functions and/or method steps previously described. That circuitry may be provided in the base station and/or in the communications device and/or in a core network entity.

As used in this application, the term "circuitry" may refer to one or more or all of the following:
 (a) hardware-only circuit implementations (such as implementations in only analogue and/or digital circuitry);
 (b) combinations of hardware circuits and software, such as:
   (i) a combination of analogue and/or digital hardware circuit(s) with software/firmware and
   (ii) any portions of hardware processor(s) with software (including digital signal processor(s)), software, and memory(ies) that work together to cause an apparatus, such as the communications device or base station to perform the various functions previously described; and
 (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of non-limiting examples a full and informative description of some examples. However, various modifications and adaptations may become apparent to those skilled in the relevant arts in view of the foregoing description, when read in conjunction with the accompanying drawings and the claims. However, all such and similar modifications of the teachings will still fall within the scope of the claims.

In the above, different examples are described using, as an example of an access architecture to which the described techniques may be applied, a radio access architecture based on long term evolution advanced (LTE Advanced, LTE-A) or new radio (NR, 5G), without restricting the examples to such an architecture, however. The examples may also be applied to other kinds of communications networks having suitable means by adjusting parameters and procedures appropriately. Some examples of other options for suitable systems are the universal mobile telecommunications system (UMTS) radio access network (UTRAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 5:
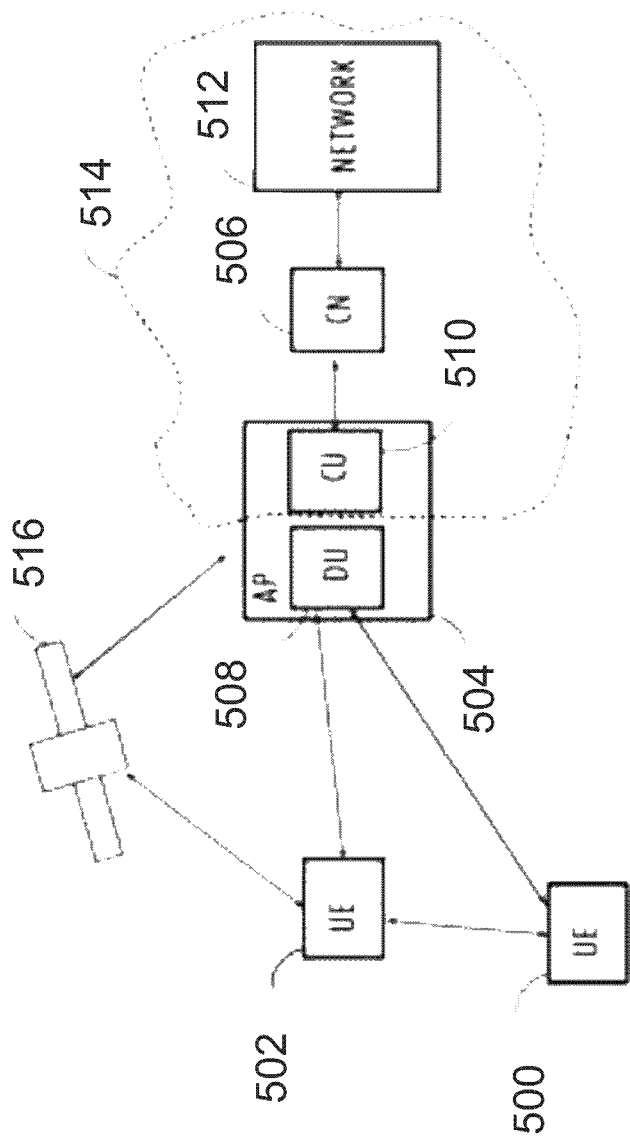
FIG. 5 shows a schematic representation of a network.

FIG. 5 depicts examples of simplified system architectures only showing some elements and functional entities, all being logical units, whose implementation may differ from what is shown. The connections shown in FIG. 5 are logical connections; the actual physical connections may be different. It is apparent to a person skilled in the art that the system typically comprises also other functions and structures than those shown in FIG. 5.

The examples are not, however, restricted to the system given as an example but a person skilled in the art may apply the solution to other communication systems provided with necessary properties.

The example of FIG. 5 shows a part of an exemplifying radio access network. For example, the radio access network may support sidelink communications described below in more detail.

FIG. 5 shows devices 500 and 502. The devices 500 and 502 are configured to be in a wireless connection on one or more communication channels with a node 504. The node 504 is further connected to a core network 506. In one example, the node 504 may be an access node such as (e/g) NodeB serving devices in a cell. In one example, the node 504 may be a non-3GPP access node. The physical link from a device to a (e/g) NodeB is called uplink or reverse link and the physical link from the (e/g) NodeB to the device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signalling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to devices. The antenna unit may comprise a plurality of antennas or antenna elements. The (e/g) NodeB is further connected to the core network 506 (CN or next generation core NGC). Depending on the deployed technology, the (e/g) NodeB is connected to a serving and packet data network gateway (S-GW+P-GW) or user plane function (UPF), for routing and forwarding user data packets and for providing connectivity of devices to one or more external packet data networks, and to a mobile management entity (MME) or access mobility management function (AMF), for controlling access and mobility of the devices.

Examples of a device are a subscriber unit, a user device, a user equipment (UE), a user terminal, a terminal device, a mobile station, a mobile device, etc.

The device typically refers to a mobile or static device (e.g. a portable or non-portable computing device) that includes wireless mobile communication devices operating with or without an universal subscriber identification module (USIM), including, but not limited to, the following types of devices: mobile phone, smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The device may also utilise cloud. In some applications, a device may comprise a user portable device with radio parts (such as a watch, earphones or eyeglasses) and the computation is carried out in the cloud.

The device illustrates one type of an apparatus to which resources on the air interface are allocated and assigned, and thus any feature described herein with a device may be implemented with a corresponding apparatus, such as a relay node. An example of such a relay node is a layer 3 relay (self-backhauling relay) towards the base station. The device (or, in some examples, a layer 3 relay node) is configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected information and communications technology, ICT, devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 5) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, e.g. below 6 GHz or above 24 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, 6 or above 24 GHZ-cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The LTE network architecture is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 512, such as a public switched telephone network, or a VoIP network, or the Internet, or a private network, or utilize services provided by them. The communication network may also be able to support the usage of cloud services, for example at least part of core network operations may be carried out as a cloud service (this is depicted in FIG. 5 by "cloud" 514). This may also be referred to as Edge computing when performed away from the core network. The communication system may also comprise a central control entity, or a like, providing facilities for networks of different operators to cooperate for example in spectrum sharing.

The technology of Edge computing may be brought into a radio access network (RAN) by utilizing network function virtualization (NFV) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud-RAN architecture enables RAN real time functions being carried out at or close to a remote antenna site (in a distributed unit, DU 508) and non-real time functions being carried out in a centralized manner (in a centralized unit, CU 510).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where Edge computing servers can be placed between the core and the base station or nodeB (gNB). One example of Edge computing is MEC, which is defined by the European Telecommunications Standards Institute. It should be appreciated that MEC (and other Edge computing protocols) can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, Mobile Broadband, (MBB) or ensuring service availability future for critical communications, and railway/maritime/aeronautical communications. Satellite communication may utilise geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (e/g) NodeBs, the device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 5 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 5). A HNB Gateway (HNB-GW), which is typically installed within an operator's network may aggregate traffic from a large number of HNBs back to a core network.

The invention claimed is:

1. A method for an apparatus for a first user equipment comprising:
    determining to provide at least one synchronization signal for sidelink communications to a second user equipment;
    determining whether to transmit a synchronization signal using a first set of synchronization resources; and
    when it is determined to transmit the synchronization signal, abstaining from transmitting a synchronization signal using a second set of synchronization resources; and
    when it is determined to abstain from transmitting the synchronization signal in the first set of synchronization resources:
    determining whether to transmit the synchronization signal using the second set of synchronization resources; and
    abstaining from using any resource coinciding in time with the second set of synchronization resources for transmitting and/or receiving a first sidelink communication.

2. The method as claimed in claim 1, further comprising, when it is determined to abstain from transmitting the synchronization signal;
- selecting a first set of communication resources for transmitting the first sidelink communication that does not coincide in time with the second set of synchronization resources in response to determining that the first user apparatus intends to transmit the first sidelink communication during the second set of synchronization resources; and
- using the first set of communication resources for transmitting the first sidelink communication.

3. The method as claimed in claim 1, further comprising, when it is determined to abstain from transmitting the synchronization signal;
- determining that the first user apparatus intends to, during the second set of synchronization resources, transmit first feedback in respect of a received second sidelink communication; and
- abstaining from transmitting the first feedback during the second set of synchronization resources in response to the determination.

4. The method as claimed in claim 1, further comprising, when it is determined to abstain from transmitting the synchronization signal;
- determining that the first user apparatus intends to request to receive second feedback in respect of a third sidelink communication, with the second feedback being expected to be received during the second set of synchronization resources; and
- abstaining from requesting the second feedback.

5. The method as claimed in claim 1, wherein the determining whether to transmit the synchronization signal comprises:
- when it is determined that a synchronization signal was received from another user equipment during the first set of synchronization resources, abstaining from transmitting the synchronization signal during the second set of synchronization resources; and
- when it is determined that a synchronization signal was not received from another user equipment during the first set of synchronization resources, determining whether the first user equipment is allowed to transmit the synchronization signal during the second set of synchronization resources.

6. The method as claimed in claim 5, wherein the determining whether the first user equipment is allowed to transmit the synchronization signal comprises performing a listen before talk operation.

7. The method as claimed in claim 1, further comprising:
- when it is determined that the synchronization signal was not transmitted in the second set of synchronization resources by the first user equipment, determining whether to transmit a synchronization signal using a third set of synchronization resources.

8. The method as claimed in claim 1, wherein the determining whether to transmit the synchronization signal using the first set of synchronization resources comprises performing a listen before talk operation to determine whether the first user equipment is allowed to transmit the synchronization signal.

9. An apparatus for a first user equipment comprising means for:
- determining to provide at least one synchronization signal for sidelink communications to a second user equipment;
- determining whether to transmit a synchronization signal using a first set of synchronization resources; and
- when it is determined to transmit the synchronization signal, abstaining from transmitting a synchronization signal using a second set of synchronization resources; and
- when it is determined to abstain from transmitting the synchronization signal in the first set of synchronization resources:
- determining whether to transmit the synchronization signal using the second set of synchronization resources; and
- abstaining from using any resource coinciding in time with the second set of synchronization resources for transmitting and/or receiving a first sidelink communication.

* * * * *